US010754619B2

(12) United States Patent
Satpathy et al.

(10) Patent No.: US 10,754,619 B2
(45) Date of Patent: Aug. 25, 2020

(54) SELF-CALIBRATED VON-NEUMANN EXTRACTOR

(71) Applicant: Intel Corporation, Santa Clara, CA (US)

(72) Inventors: Sudhir Satpathy, Hillsboro, OR (US); Sanu Mathew, Portland, OR (US); Vikram Suresh, Portland, OR (US); Raghavan Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/143,770

(22) Filed: Sep. 27, 2018

(65) Prior Publication Data

US 2020/0104101 A1    Apr. 2, 2020

(51) Int. Cl.
*G06F 7/58* (2006.01)
*H04L 9/32* (2006.01)
*G06F 21/75* (2013.01)

(52) U.S. Cl.
CPC .......... *G06F 7/588* (2013.01); *G06F 21/755* (2017.08); *H04L 9/3278* (2013.01)

(58) Field of Classification Search
None
See application file for complete search history.

(56) References Cited

U.S. PATENT DOCUMENTS

| 2014/0040338 | A1* | 2/2014 | Van Der Sluis | H04L 9/0866 708/254 |
| 2014/0189890 | A1* | 7/2014 | Koeberl | H04L 9/0866 726/34 |
| 2016/0204781 | A1* | 7/2016 | Plusquellic | H03K 19/00323 326/8 |
| 2017/0083289 | A1* | 3/2017 | Hoeppner | G06F 7/588 |
| 2018/0129801 | A1* | 5/2018 | Cambou | G06F 21/44 |
| 2018/0270014 | A1  | 9/2018 | Muratani | |
| 2019/0026457 | A1* | 1/2019 | Plusquellic | H04L 9/0866 |

FOREIGN PATENT DOCUMENTS

WO    2018122230 A1    7/2018

OTHER PUBLICATIONS

International Search Report and Written Opinion for International Patent Application No. PCT/US2019/053668, dated Jan. 16, 2020, 9 pages.
Satpathy et al., "An All-Digital Unified Static/Dynamic Entropy Generator Featuring Self-Calibrating Hierarchical Von Neumann Extraction for Secure Privacy-Preserving Mutual Authentication in IoT Mote Platforms," 2018 IEEE Symposium on VLSI Circuits, Oct. 25, 2018, pp. 169-170.

(Continued)

*Primary Examiner* — Michael D. Yaary
(74) *Attorney, Agent, or Firm* — Jordan IP Law, LLC

(57) ABSTRACT

An embodiment of a semiconductor package apparatus may include technology to provide an entropy extractor including a physically unclonable function (PUF), a true random number generator (TRNG), an entropy source coupled to both the PUF and the TRNG, and a circuit to self-calibrate the entropy extractor. Other embodiments are disclosed and claimed.

25 Claims, 20 Drawing Sheets

(56) References Cited

OTHER PUBLICATIONS

Satpathy et al., "Ultra-low Energy Security Circuits for IoT Applications," 2016 IEEE 34th International Conference on Computer Design(ICCD), Nov. 24, 2016, pp. 682-685.
Varchola et al., "New Universal Element with Integrated PUF and TRNG capability," 2013 International Conference on Reconfigurable Computing and FPGAs (ReConFig), Feb. 6, 2014, 6 pages.
Maiti et al., "Physical unclonable function and true random number generator: a compact and scalable implementation," GLSVLSI '09: Proceedings of the 19th ACM Great Lakes symposium on VLSI, May 2009, 4 pages.

* cited by examiner

SELF-CALIBRATED VON-NEUMANN EXTRACTOR

TECHNICAL FIELD

Embodiments generally relate to security systems. More particularly, embodiments relate to a self-calibrated Von-Neumann extractor.

BACKGROUND

Static and dynamic entropy generation circuits are key primitives that provide the foundation for security and trust in all cryptographic applications. Physically Unclonable Functions (PUFs) and true random number generators (TRNG) are two of the most popular approaches to harvest static and dynamic entropy respectively. Static entropy (e.g., a PUF) manifests in the form of a unique response (e.g., identification ID) that can be repeatedly created with high accuracy for every device instance and can be reliably used for chip identification and root of trust. This is accomplished by exploiting manufacturing induced variation with circuits/techniques that enhance/reinforce such spatial instance specific random mismatch and suppress temporal variability (e.g., thermal noise). Dynamic entropy circuits on the other hand, subdue spatial process/manufacturing induced variation to amplify the influence of temporal random sources of variation. Such contrasting design criteria require separate implementations of these critical security primitives increasing die area and design time/cost.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
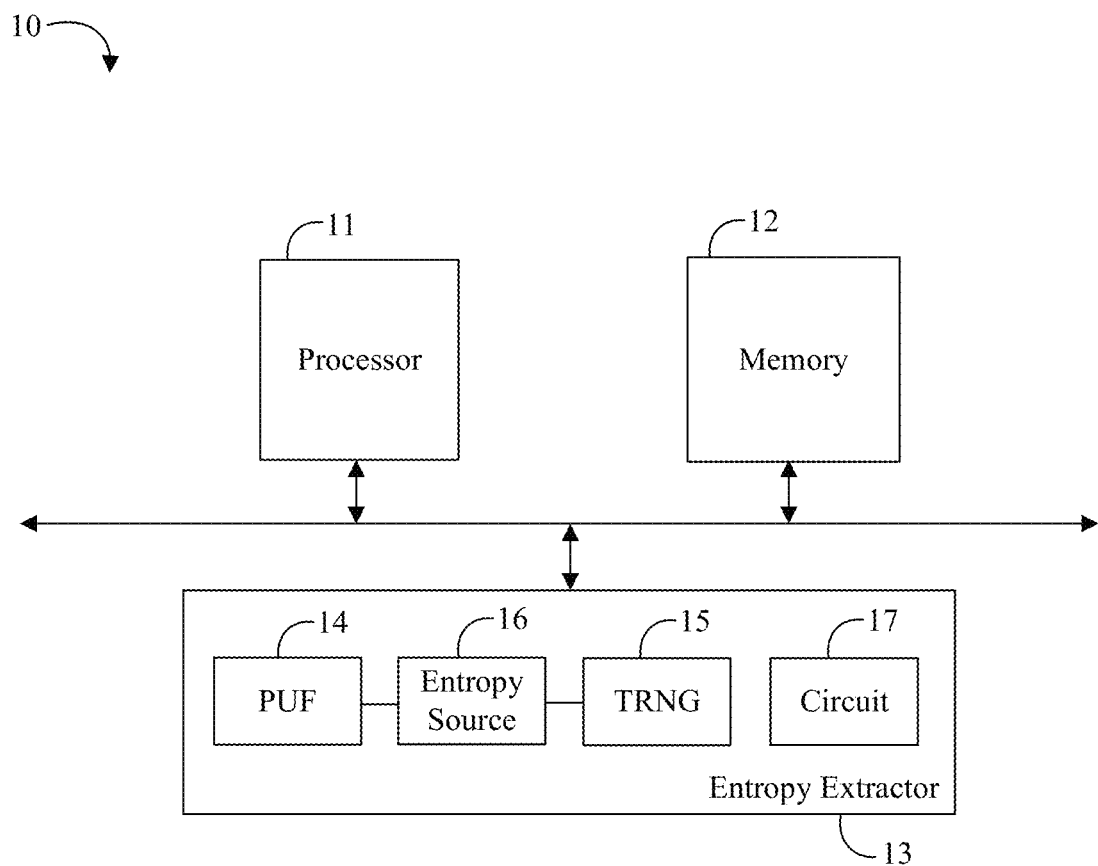
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and an entropy extractor 13 communicatively coupled to the processor 11. The entropy extractor 13 may include a physically unclonable function (PUF) 14, a true random number generator (TRNG) 15, an entropy source 16 coupled to both the PUF 14 and the TRNG 15, and a circuit 17 to self-calibrate the entropy extractor 13 (e.g., as described in more detail herein). In some embodiments, the circuit 17 may be further configured to adaptively select the entropy source 16. For example, the circuit 17 may be configured to measure a stability of cells of the PUF 14, and replace less unstable cells of the PUF 14 with highly unstable cells of the PUF 14. Additionally, or alternatively, the circuit 17 may be configured to provide residual entropy injection. For example, the circuit 17 may be further configured to inject left over entropy of more unstable cells of the TRNG 15 into less unstable cells of the TRNG 15. Additionally, or alternatively, the circuit 17 may be configured to identify a voltage glitch attack on the entropy extractor 13. For example, the circuit 17 may be configured to swap out cells under attack in response to the identified voltage glitch attack, and/or to shut down operation in response to the identified voltage glitch attack. In any of the embodiments herein, the entropy extractor may comprise a Von-Neumann (VN) extractor. For example, the VN extractor may be configured to sample highly unstable cells in the PUF 14, generate a TRNG bit-stream, and continuously monitor the TRNG bit-stream for quality assurance. In some embodiments, all or some of the components of the entropy extractor 13, including the circuit 17, may be located in, or co-located with, various components, including the processor 11 (e.g., on a same die).

Embodiments of each of the above processor 11, memory 12, entropy extractor 13, PUF 14, TRNG 15, entropy source 16, circuit 17, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a controller, a micro-controller, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the circuit 17, self-calibrating the entropy extractor 13, adaptively selecting the entropy source, etc.).

Figure 2:
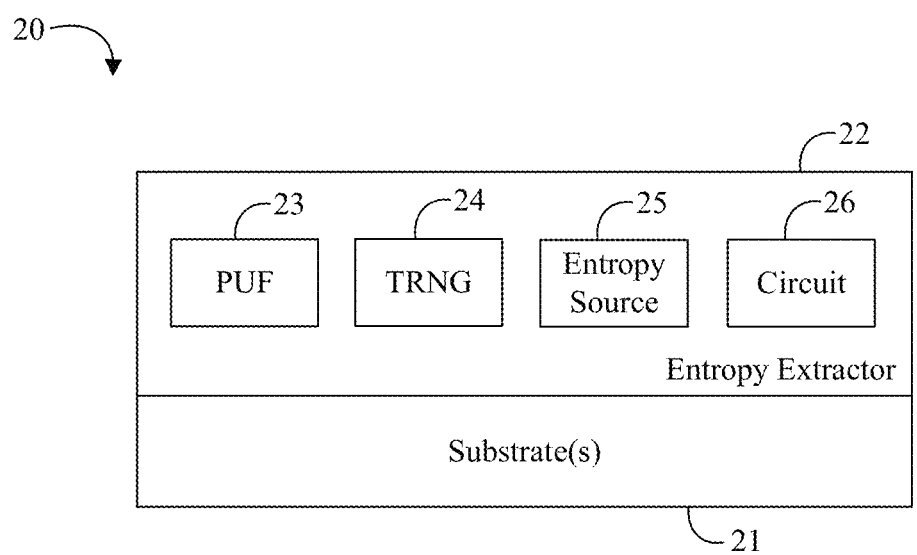
FIG. 2 is a block diagram of an example of a semiconductor package apparatus according to an embodiment.

Turning now to FIG. 2, an embodiment of a semiconductor package apparatus 20 may include one or more substrates 21, and an entropy extractor 22 coupled to the one or more substrates 21, wherein the entropy extractor 22 is at least partly implemented in one or more of configurable circuitry and fixed-functionality hardware circuitry (e.g., including logic circuits). The entropy extractor 22 coupled to the one or more substrates 21 may include a PUF 23, a TRNG 24, an entropy source 25 coupled to both the PUF 23 and the TRNG 24, and a circuit 26 to self-calibrate the entropy extractor 22. In some embodiments, the circuit 26 may be further configured to adaptively select the entropy source 16. For example, the circuit 26 may be configured to measure a stability of cells of the PUF 23, and replace less unstable cells of the PUF 23 with highly unstable cells of the PUF 23. Additionally, or alternatively, the circuit 26 may be configured to provide residual entropy injection. For example, the circuit 26 may be further configured to inject left over entropy of more unstable cells of the TRNG 24 into less unstable cells of the TRNG 24. Additionally, or alternatively, the circuit 26 may be configured to identify a voltage glitch attack on the entropy extractor 22. For example, the circuit 26 may be configured to swap out cells under attack in response to the identified voltage glitch attack, and/or to shut down operation in response to the identified voltage glitch attack. In any of the embodiments herein, the entropy extractor may comprise a VN extractor. For example, the VN extractor may be configured to sample highly unstable cells in the PUF 23, generate a TRNG bit-stream, and continuously monitor the TRNG bit-stream for quality assurance. In some embodiments, the entropy extractor 22 coupled to the one or more substrates 21 may include transistor channel regions that are positioned within the one or more substrates 21.

Embodiments of the entropy extractor 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of any of the embodiments discussed herein. In some embodiments, the illustrated apparatus 20 may include the one or more substrates 21 (e.g., silicon, sapphire, gallium arsenide) and the entropy extractor 22 (e.g., transistor array and other integrated circuit/IC components) coupled to the substrate(s) 21. The entropy extractor 22 may be implemented at least partly in configurable logic or fixed-functionality logic hardware. In one example, the entropy extractor 22 may include transistor channel regions that are positioned (e.g., embedded) within the substrate(s) 21. Thus, the interface between the entropy extractor 22 and the substrate(s) 21 may not be an abrupt junction. The entropy extractor 22 may also be considered to include an epitaxial layer that is grown on an initial wafer of the substrate(s) 21.

Some embodiments may advantageously provide TRNG bit-stream generation from a PUF array using a self-calibrating VN extractor with adaptive source selection and residual entropy injection. PUFs and TRNGs may be foundational security primitives underpinning the root of trust in public key infrastructure (PKI) for digital signing, certificate generation, and privacy-preserving mutual authentication (PMA). Contradictory design strategies to harvest static and dynamic entropies typically necessitate independent PUF and TRNG circuits, limiting usage in area and energy constrained IoT edge platforms. Furthermore, verification and integration of separate PUF and TRNG IP blocks for different products not only increases design time/cost, but also limits reuse/portability for newer generation of IP blocks that need to be redesigned from scratch for different process technologies. Advantageously, some embodiments may provide a unified IP block for both a PUF and a TRNG. For example, some embodiments may provide technology to generate a TRNG bit-stream from an existing PUF array using a fully digital light-weight entropy extractor that not only reduces logic overhead, but also enables run-time adaptation to varying operating conditions and resilience to power side channel attack. Some embodiments of the extraction technology may be implemented as an ASIC, in FPGA or in software as well, and may not require any modification to existing PUF structures for TRNG generation. Some embodiments may make TRNG incorporation seamless at very low logic overhead and design effort in many products that may require or benefit from a PUF IP block.

Some other systems may be based on separate PUF and TRNG implementations for static and dynamic entropy generation. Area and cost constrained products that can't afford both IP blocks, however, and may either use non-volatile memory (NVM) to store a secret identifier (ID) (e.g., for PUF usage), or may use a pseudo-random number generator (PRNG) in place of a TRNG. Both of these approaches may result in security loop-holes that makes the platform vulnerable to side-channel attacks. Separate PUF and TRNG IP blocks double design, verification and integration efforts, potentially leading to delayed product introductions. Both IP blocks may also need to undergo post-silicon validation and tuning that results in additional cost.

Some embodiments may advantageously provide a reconfigurable hierarchical VN extractor unit to sample highly unstable cells in a PUF array to generate a TRNG bit-stream that is continuously monitored for quality assurance. Some embodiments of the VN extractor may provide controls to measure the PUF array stability to opportunistically replace less unstable with highly unstable cells, thereby providing real-time adaptation to process, voltage and temperature fluctuations. In some embodiments, short term TRNG throughput loss may be further mitigated by injecting left over entropy of more unstable cells into less unstable ones, until they are permanently swapped. In addition to maximizing dynamic entropy extraction, some embodiments of the reconfigurable VN unit may identify voltage glitch attacks resulting in sudden performance loss, and provide protection against such threats by swapping out cells under attack or shutting down system operation.

As noted above, PUF and TRNG may be foundational building blocks for many cryptographic protocols. Some embodiments of a unified PUF/TRNG IP block may offer tremendous value by lowering design cost and validation overhead that is currently incurred with separate implementations. Usually PUF and TRNGs are offered as hard IP blocks, making them prohibitively expensive to design and characterize across multiple process technologies. Some embodiments of a unified PUF/TRNG IP block may advantageously reduce IP maintenance effort and cost by half, making it possible to accelerate time-to-market for many products. In addition, some embodiments may provide a low overhead technology to mitigate side-channel attack related security threats, which may be implemented in a FPGA or firmware without redesigning the hard IP blocks (e.g., which may be integrated for usage in new products as well as existing products with minimal design effort).

Figure 3:
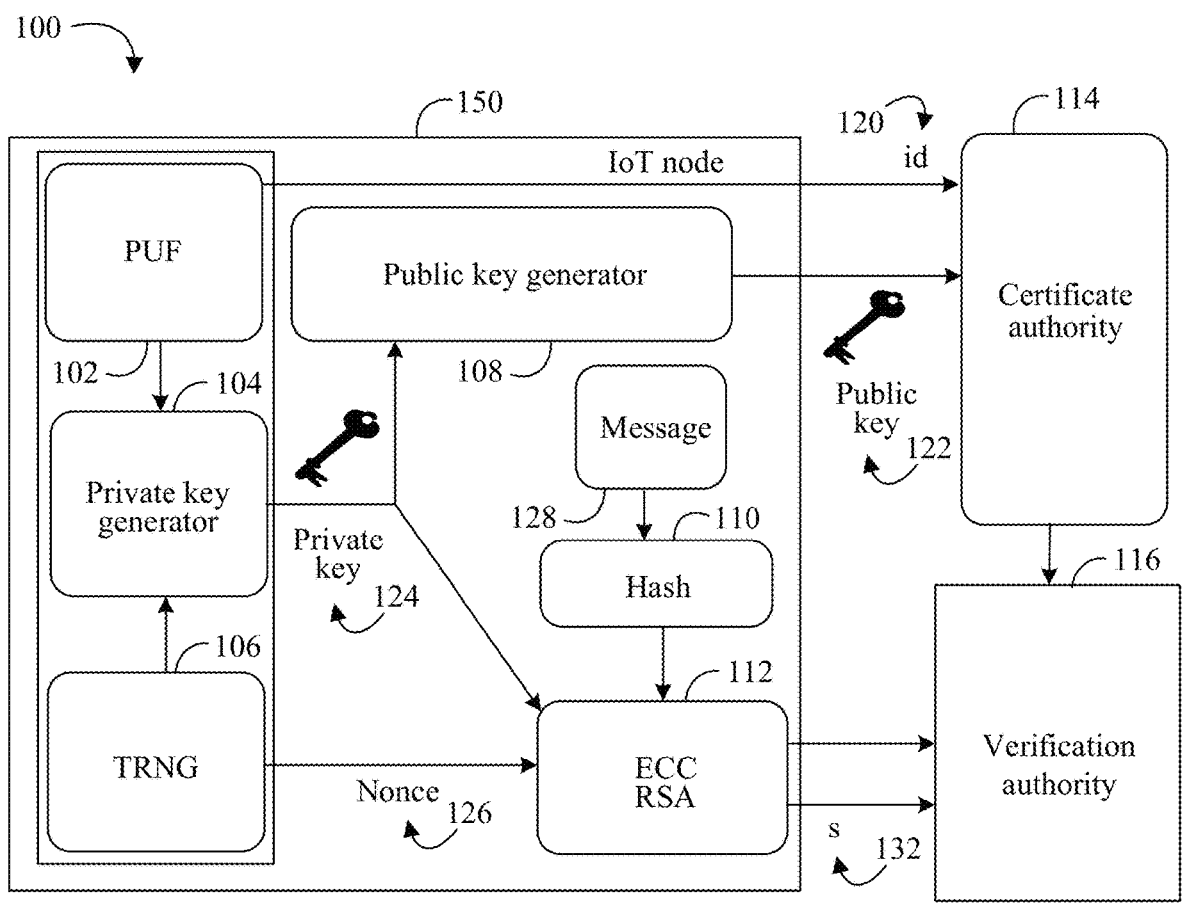
FIG. 3 is a block diagram of an example of a public key infrastructure according to an embodiment.

Turning now to FIG. 3, a Public Key Infrastructure (PKI) diagram 100 is illustrated according to some embodiments. One purpose of PKI is to provide the means for a secure digital transfer of information. It is used in activities and digital transfer of information when simple passwords are not an adequate authentication method and a stronger proof is used to confirm the identity of the parties involved in the communication and to validate the information being transferred. A PKI is a system for the generation, storing, and distribution of digital certificates which are used to certify and verify that a certain public key belongs to a particular entity. In the PKI process, digital certificates are created which map public keys to entities, and these digital certificates are stored in a central repository and can be revokes if needed.

The PKI 100, according to some embodiments, illustrated in FIG. 3 comprises of Internet of Things (IoT) node 150, and Certificate Authority 114 and Verification Authority 116.

In some embodiments, the IoT node 150 is to exchange secure messages with the Verification authority 116. In some embodiments, the IoT node 150 comprises of a PUF 102, a TRNG 106, the Error Correction Coder (ECC) and Rivest Shamir, and Adleman (RSA) circuitry 112, a Private key generator 104, a Public key generator 108, and Hash circuitry 110.

In some embodiments, the PUF 102 and TRNG 106 circuitry are to provide respectively a static and a dynamic entropy input to the private key generator circuitry 104. The private key generator 104 is to generate private keys based on the input from PUF 102 and TRNG 106 circuitry and is to provide the generated private key to the Public key generator 108 and to the ECC (Error Correction Coder) and RSA circuitry 112. The PUF 102 also is to provide a unique "id" 120 to the Certificate authority 114. The Public key generator 104 is to generate a public key 122 based on the input from the private key 124 generated by the Private key generator 104 and is to provide the public key 122 to the Certificate authority 114. The Certificate authority 114 is to issue, store, and sign digital certificates based on the unique "id" 120 and Public key 122. A Verification Authority 116 is to verify the identity of entities requesting their digital certificates, provided by the Certificate authority 114. The message to be sent is first hashed by the Hash circuitry 110 and then encrypted by the ECC/RSA circuitry 112 using the Private Key 124, and the Nonce 126. In cryptography, a "Nonce" is a random and arbitrary number which can only be used once. Nonce is often a pseudo-random or random number generated in an authentication protocol to ensure that old communications cannot be reused by unauthorized entities or in replay attacks. In some embodiments, the Nonce 126 is to be generated by the TRNG 106. The ECC/RSA circuitry 112 is to send the encrypted message to the Verification authority 116 along with an encrypted signature "s" 132. The Verification authority 116 is to verify the digital certificate and is to decrypt the message 130 using the public key 122, and the encrypted signature input "s" 132.

Figure 4:
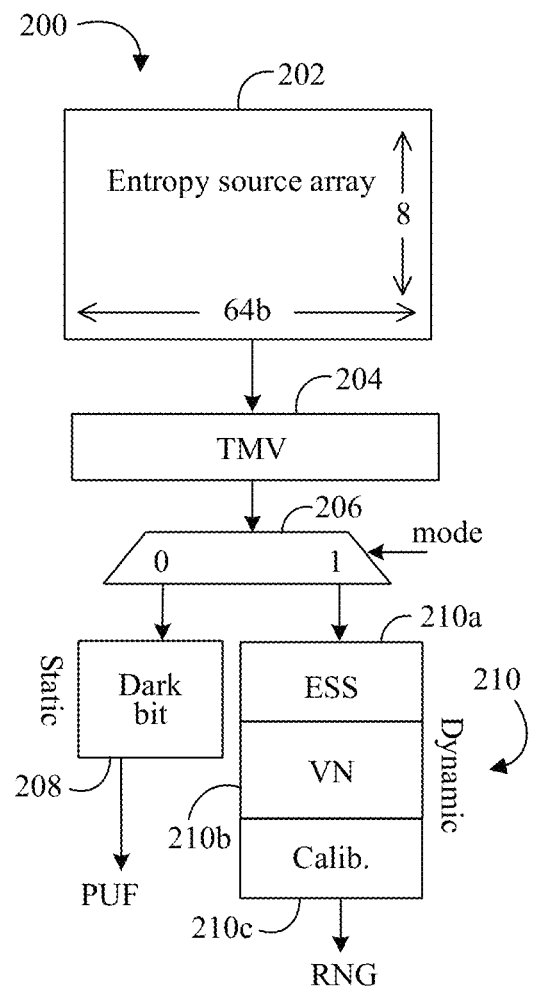
FIG. 4 is a block diagram of an example of an entropy extractor according to an embodiment.

Turning now to FIG. 4, an embodiment of an entropy extractor 200 may include an entropy source (ES) array 202, a temporal majority voting (TMV) function 202, a multiplexer 206, a static entropy extractor 208 (e.g., including a dark bit function), and a dynamic entropy extractor 210 (e.g., including entropy source selector (ESS) 210a, a VN extractor 210b, and a self-calibration function 210c). Private/public keys and nonces for PKI may be generated by harvesting static and dynamic entropy from PUF and TRNG circuits respectively. Traditional PUF/TRNG implementations employ separate sources of raw entropy with mechanisms to respectively attenuate/amplify influence of random thermal noise, while also exacerbating/subduing impact of random process variation for robust operation. In contrast, some embodiments of a hybrid design may be organized around a single five hundred twelve (512) bit array of bistable cross-coupled inverters that serve as a common entropy source for PUF and TRNG operations (e.g., entropy source array 202). TMV-based source selection may evaluate the entire ES array 202 (e.g., with the TMV function 204), generating a bias map to sequester array bits into PUF and TRNG candidates.

The ES array 202 may comprise a PUF array which includes an array of bi-stable cross-coupled inverter cells. In some embodiments, the array comprises of 512 bits (e.g., 64 bits by 8 bits). Though all cells in the ES array 202 comprise identically laid-out matched devices, random manufacturing induced variation introduces a bias towards 1 or 0 in each cell. Cells that are strongly biased towards a 0 or 1 (e.g., stable cells) are good candidates for static entropy generation while those that are least biased or unbiased (e.g., unstable) may be used as sources for dynamic entropy. Unlike prior PUF implementations where, least biased (or unbiased) unstable cells are excluded from key generation, embodiments of the present invention use them for generating a random bit-stream. The raw responses from the ES array 202 are to undergo temporal majority voting by the TMV function 204, wherein the output of each cell is to be accumulated for some consecutive cycles, to quantify their inherent bias.

In some embodiments, each cell is accumulated for some consecutive cycles (e.g., 127 consecutive cycles). The output of the TMV function is to be multiplexed by the multiplexer 206. For static entropy generation, the TMV output is to be received by the Dark bit function 208 to generate the PUF output. Dark bit function 208 may include any circuitry, logic, or other hardware and/or firmware to provide for the assessment of the characteristics of one or more PUF cells in PUF cell array 202, to provide for screening and marking as "dark bits" those PUF cells that are identified to not meet stability requirements, and to provide for the screening and masking of dark bits from use in the generation of PUF key(s). Therefore, dark bit function 208 provides for reduction of the error rate of PUF key generation by discarding or replacing noisy PUF bits.

For dynamic entropy generation, the TMV output may be received by the ESS function 210a and the VN extractor function 210b to generate the Random Number Generator (RNG) output. The ESS function 210a is to create a bias map based on the input from the TMV function 204. The bias map records the bias associated with each cell in the source array. The most unbiased (e.g., unstable) entries in the bias map are candidates for RNG generation. Although a bias map could indicate the presence of a significant number of cells in the ES array that are unstable, not all of them qualify for cryptographic quality random stream generation. In some embodiments, extensive National Institute of Standards and Technology (NIST) randomness test analysis on bit streams generated from a large number of evaluations (e.g., 75K evaluations) of unstable cells indicate that few cells (e.g., only 5 of the 6144 cells) are sufficiently unbiased to generate cryptographic quality entropy. Additionally, the raw streams generated from these best TRNG candidates fail most of the other NIST tests. Hence, these raw streams need to undergo entropy extraction for cryptographic usage. In some embodiments, the ESS circuitry 210a generates an entropy source selection set comprising of the top N most unstable entropy sources based on the bias map, where N is an integer number. In some embodiments, the ESS circuitry 210a generates an entropy source selection set comprising of the 4 most unstable entropy sources based on the bias map.

Figures 5A, 5B, 5C:
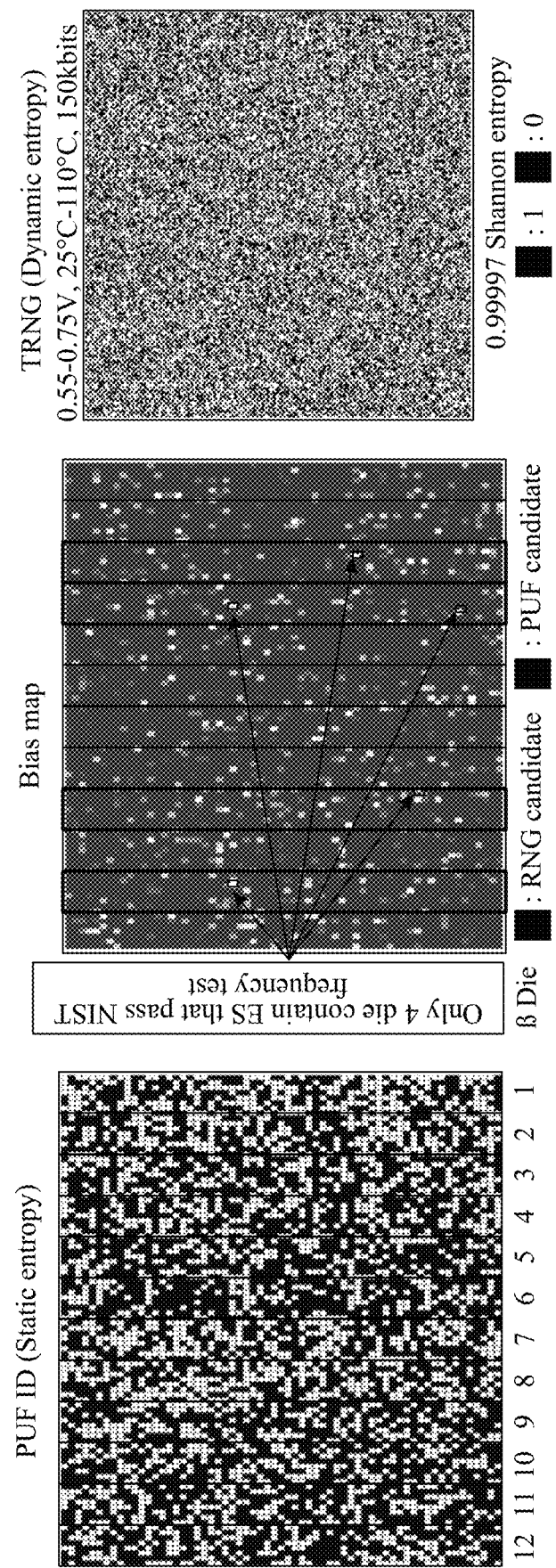
FIGS. 5A to 5C are illustrative diagrams of a static entropy source, a bias map, and a dynamic entropy source according to embodiments.

Turning now to FIGS. 5A to 5C, an example of measurement results of 6144 bits (12 chips times 512 bits per chip) at 0.65V, 70° C. may show that 86% of array bits consistently evaluate to stable values providing static entropy for PUF key, while the remaining 14% bits exhibit time-variant behavior making them potential candidates for random stream generation. FIGS. 5A and 5B may show a visual mapping of a static entropy source to a bias map. The speckle pattern in FIG. 5A may illustrate the static entropy (e.g., used for PUF key derivation) measured from 12 512-bit ES arrays. The white speckles represent a cell within the array with output of "1" and the black speckles represent a cell with an output of "0". The speckle pattern in FIG. 5B is derived from the raw responses from the ES array undergoing temporal majority voting, wherein the output of each cell is accumulated for some consecutive cycles, to quantify their inherent bias.

The speckle pattern in FIG. 5B may illustrate bias distribution marking off black and white cells as candidates for static and dynamic entropy generation respectively. The white cells correspond to unstable cells to be used for RNG generation, and the black cells represent the more stable cells to be used for PUF generation, in some embodiments, the ESS circuitry is to receive the bias quantification information for each cell, and is to generate the bias map based on that information in some embodiments, the bias map is to record the bias, associated with each cell in the source array. In some examples, the most unbiased entries in the bias map are candidates for RNG generation. In some embodiments, the ESS circuitry 210a is to generate an entropy source selection set comprising of the top N most unstable entropy sources based on the bias map, where N is an integer number. In some embodiments, the ESS circuitry 210a is to generate an entropy source selection set comprising of the 4 most unstable entropy sources based on the bias map. Further analysis of 75 Kbit random streams from the TRNG candidates may identify only 5 ES across 12 chips with sufficient individual entropy to pass a NIST frequency test. Some embodiments may provide multiple dynamic ES with post-processing circuits to generate a cryptographic quality full-entropy random bitstream.

Figure 6A:
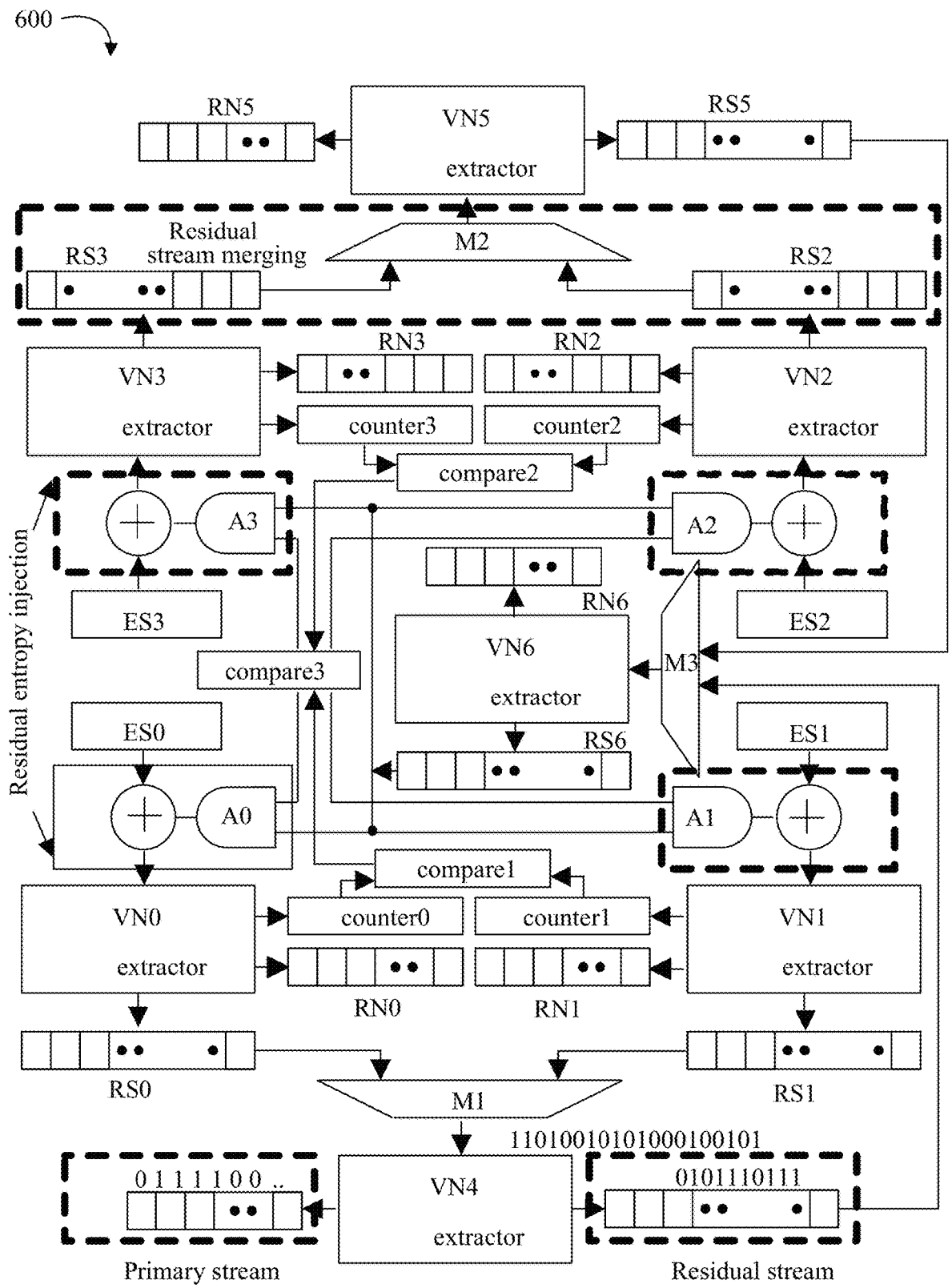
FIG. 6A is a block diagram of an example of a hierarchical Von Neumann extractor according to an embodiment.
Figure 6B:
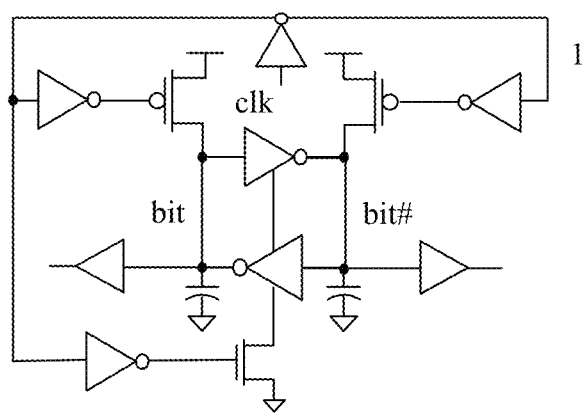
FIG. 6B is a schematic diagram of an example of a cell of an entropy source according to an embodiment.
Figure 6C:
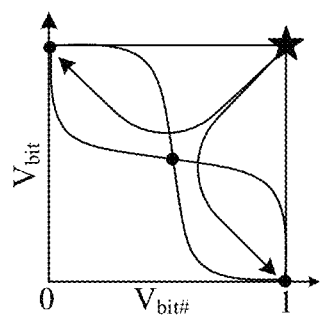
FIG. 6C is an illustrative graph of an example of voltage signals of a cell of an entropy source according to an embodiment.
Figure 6D:
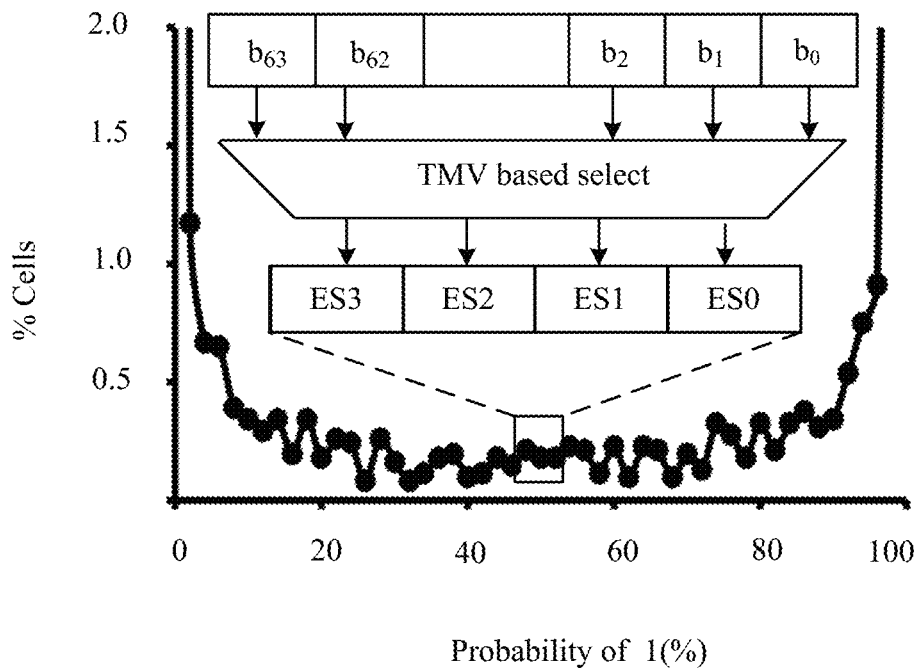
FIG. 6D is an illustrative diagram of an example of temporal majority voting according to an embodiment.
Figure 6E:
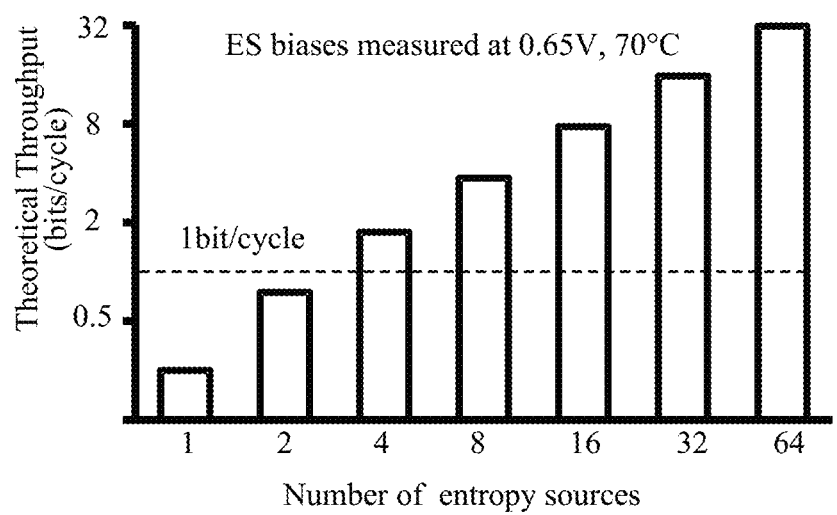
FIG. 6E is an illustrative graph of an example of number of entropy sources versus theoretical throughput according to an embodiment.

Turning now to FIGS. 6A to 6E, an embodiment of a hierarchical VN extractor 600 may be readily substituted for the VN extractor 210b (FIG. 4). FIG. 6B is an embodiment of a TRNG candidate cell. FIG. 6C shows the output of a cell that may be considered unbiased or least biased. FIG. 6D shows how TRNG candidate cells may be evaluated to select cells based on TMV. FIG. 6E shows an illustrative example of how many entropy sources may be needed to meet a desired throughput.

For example, the VN extractor 600 may include TRNG post-processing hardware features such as a hierarchical tree of VN extractors that combine randomness harvested from a selected number of high-entropy array bits. In contrast to iterative VN networks that distill leftover entropy from a single source, the VN tree collates entropy of multiple TRNG source bits, while reinforcing low-entropy sources by adaptive injection of residual entropy.

FIG. 6A illustrates a block diagram of a tri-level VN extractor architecture harvesting entropy from 4 sources, ES0, ES1, ES2, and ES3. However, other number of sources, may also be used. In some embodiments, at the first level, the architecture comprises four VN extractors VN0, VN1, VN2, and VN3; and the four entropy sources ES0, ES1, ES2, and ES3. The first level also includes throughput monitors, including counter functions, "counter0", "counter1", "counter2", and "counter3"; and comparator functions "compare1", "compare2", and "compare3" coupled together as shown.

In some embodiments, each VN extractor generates a random bit only when a raw-bit flips (01 or 10 patterns), resulting in a throughput that is inversely proportional to the amount of bias inherently present in the ES. It thus filters out intermittent periods of stable operation, thereby always guaranteeing a high quality random stream. As a result, the four VN extractors at the first level are to generate random streams RN0, RN1, RN2, and RN3. Each VN extractor also is to generate a residual stream at a threshold output, e.g., 50% throughput, (e.g., 00/11 generates 0 while 01/10 generates 1), which is merged onto a neighboring residual stream for second level VN processing. The four VN extractors are to generate residual streams RS0, RS1, RS2, and RS3. At the second level, the architecture includes two VN extractors, VN4, and VN5. Similar to the first level, each VN extractor in the second level is to generate a random bit when a raw-bit flips (01 or 10 patterns), resulting in a throughput that is inversely proportional to the amount of bias inherently present in the residual stream. The extractor 600 thus filters out intermittent periods of stable operation, thereby always guaranteeing a high quality random stream.

The two VN extractors generate random streams RN4, and RN5. The two VN extractors also generate residual streams RS4 and RS5. In this example, the resulting residual stream is generated at 50% throughput (e.g., 00/11 generates 0 while 01/10 generates 1), which is further merged onto a neighboring residual stream for third level VN processing. At the third level, the architecture includes one VN extractor, VN6. The VN extractor VN6 in the third level is to generate a random bit when a raw-bit flips (01 or 10 patterns), resulting in a throughput that is inversely proportional to the amount of bias inherently present in the input residual stream. The VN extractor VN6 generates random stream RN6 and residual stream RS6.

Throughput monitors continuously evaluate the quality of raw ES streams, and opportunistically top off the stream with the least native entropy with the residual entropy stream gathered at the final VN extractor VN6. The throughput monitoring quantifies how well the VN units are performing. Each counter is to count the number of bits its coupled VN unit produces, and for each VN pair (VN0, VN1) and (VN2, VN3), the counts are to be compared respectively by "compare1" and "compare2" functions. The output of each compare function is to select the VN extractor which produces least number (less throughput) of bits.

The outputs of "compare 1" and "compare2" then are to be provided to "compare3", which makes the final selection of the VN extractor which has the least number of bits (e.g., counts) among the four VN extractors. Each VN extractor at the first level is to process the raw bits generated from the TRNG candidate cells from corresponding ES arrays, and is to generate a random stream and a residual left-over entropy stream. Furthermore, the level one also is to implement residual entry harvesting. The residual entry harvesting to be achieved by combining the output of the ES arrays with the residual stream generated by VN6, based on the output of "compare3" through AND functions A0, A1, A2, and A3. Since "compare3" is to produce an output of "1" corresponding to one of the VN extractors with the least number of output bit counts, one of the four VN extractors is to get activated for residual entry harvesting. For the selected VN extractor block, its ES array input is to be combined with the residual stream generated by VN6. One purpose of combining is to fix the problem of low count at the output of the selected VN extractor.

It should be evident to those skilled in the art that the light-weight hierarchical Von-Neumann extractor architecture 600 could be extended to any number of ES sources. In general, for an N number of ES sources, the architecture would require 2N−1 VN extractor units, and the similarly extended corresponding logic In accordance with some embodiments, each VN unit generates a variable throughput primary bitstream from transitioning input bits (1 for 10 and 0 for 01), along with a residual stream (0 for 00/11 and 1 for 01/10) of left-over entropy at half throughput. While throughput improves with increasing number of entropy sources, a tri-level extractor with seven VN units processing raw streams from 4 TRNG candidates produces sufficient entropy to meet the target throughput of 1 Gb/s. In a reconfigurable organization the appropriate number of candidates can be selected in response to the required throughput as shown in FIG. 6E.

Figure 7A:
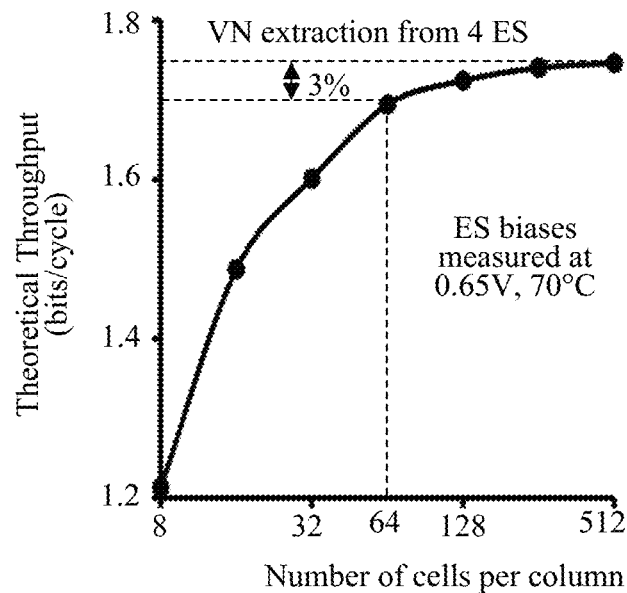
FIG. 7A is an illustrative graph of an example of number of cells per column versus theoretical throughput according to an embodiment.
Figure 7B:
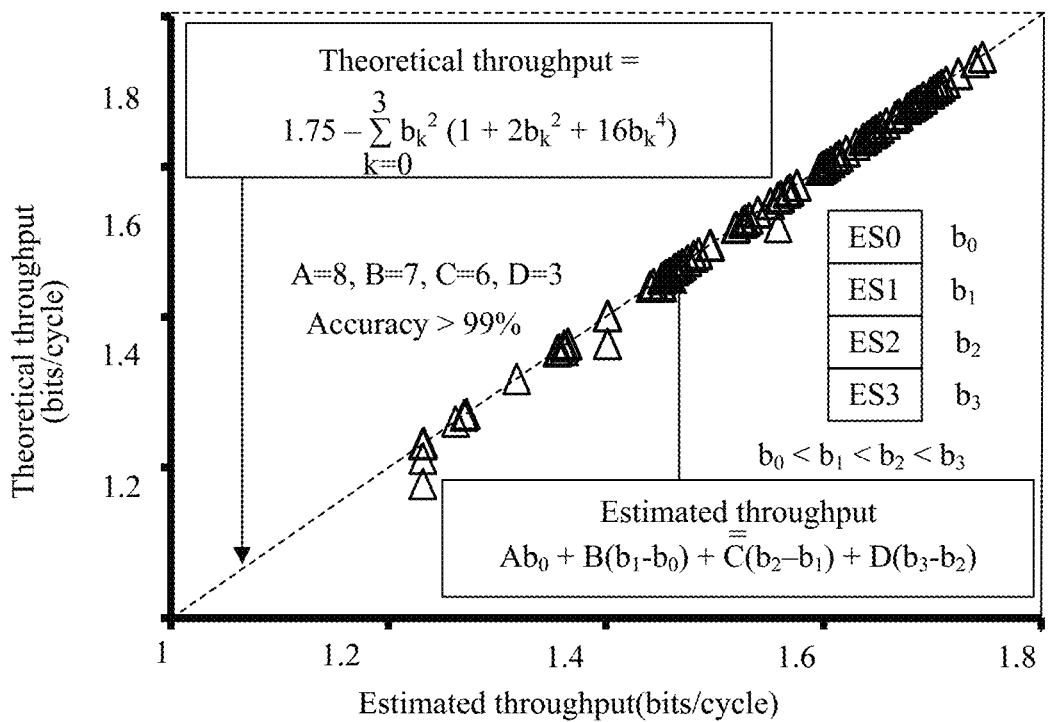
FIG. 7B is an illustrative graph of an example of estimated throughput versus theoretical throughput according to an embodiment.
Figure 7C:
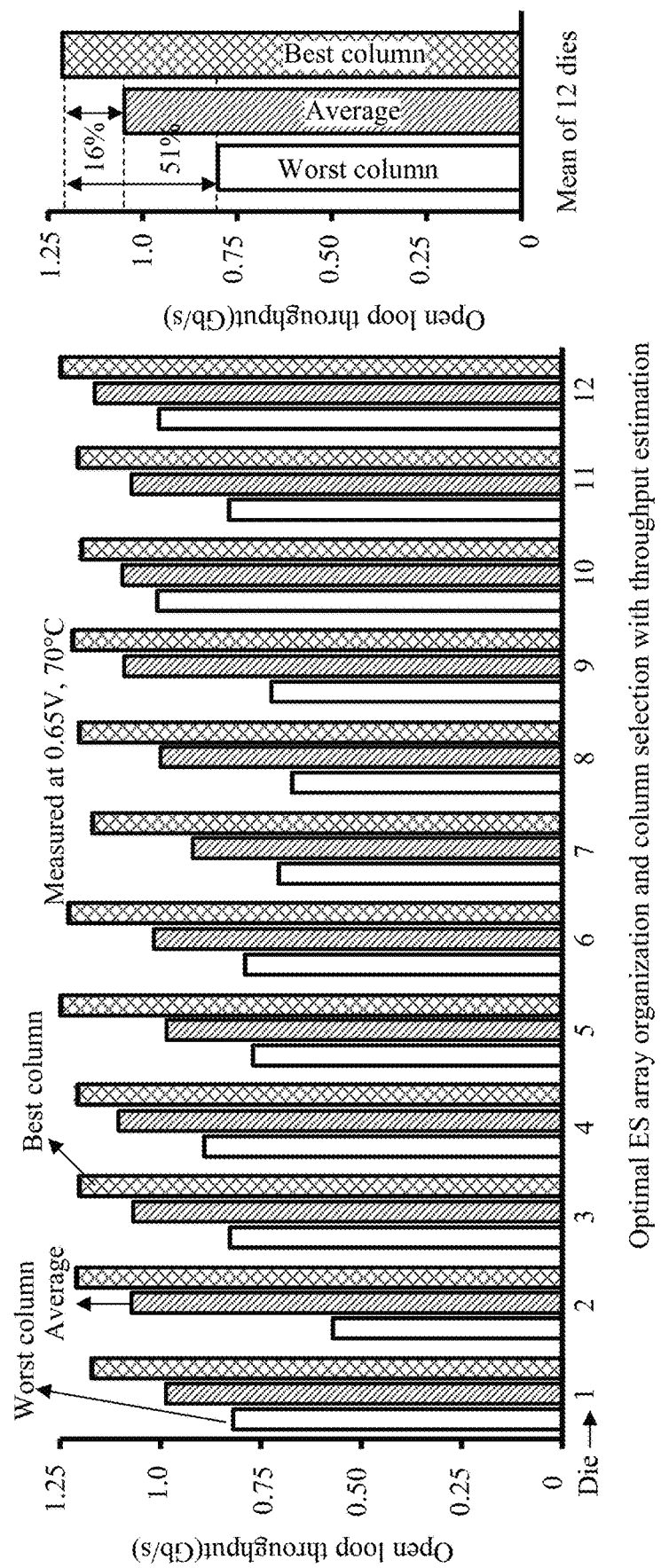
FIG. 7C is an illustrative bar graph of an example of comparing open loop throughput for a number of die according to an embodiment.

Turning now to FIG. 7A to 7C, illustrative graphs show various example performance parameters for some embodiments. For the sake of simplicity, a non-limiting example of a tri-level extractor with 7 VN units for 1 Gb/s TRNG performance is used to explain aspects of some embodiments. FIG. 7C shows that column-aligned TMV circuits may benefit from an ES array organization that maximizes the likelihood of finding four high-quality TRNG candidate bits in a single array column while minimizing polling overheads. For example, a 64×8 array organization with 64 TMV counters enables 69% area and 82% energy savings at 3% lower throughput over a 512×1 array (see FIG. 7C). Example performance analysis on bitstreams collected from 12 chips at 0.65V, 70° C., indicates up to 51% throughput improvement (16% on average) by selecting the optimal array column containing the four maximal-entropy TRNG candidate bits.

Figure 8A:
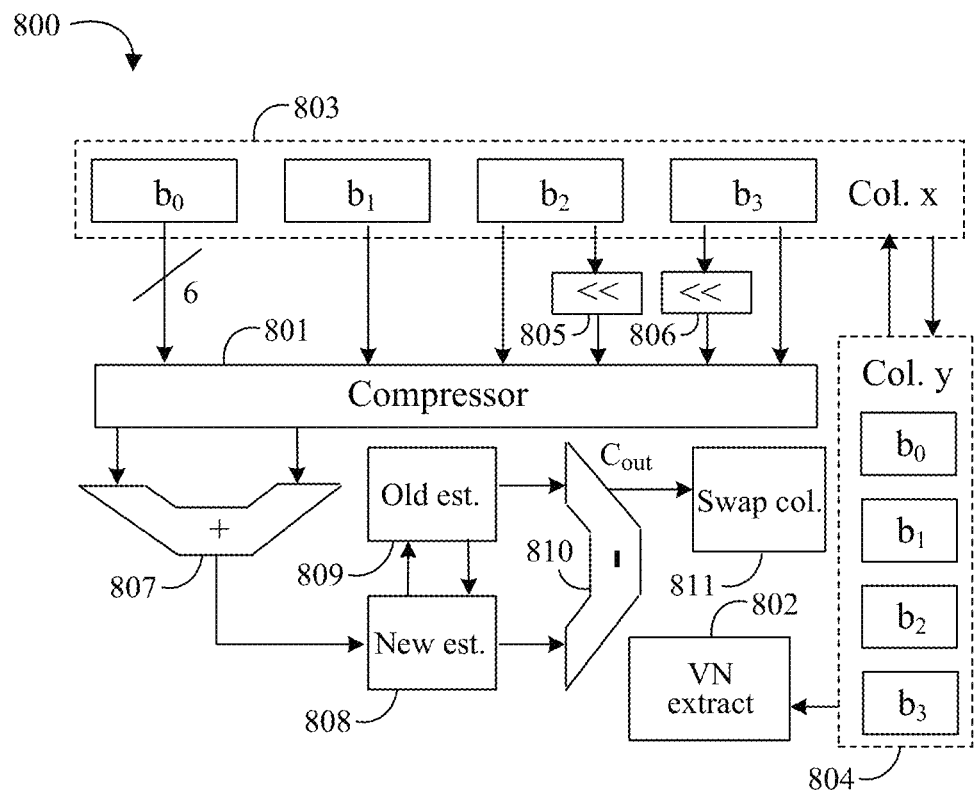
FIG. 8A is a block diagram of an example of a column selector according to an embodiment.

Turning now to FIG. 8A, an embodiment of a column selector 800 may implement the estimated throughput equation that is mentioned in FIG. 7B, with A=8, B=7, C=6, and D=3. Shift blocks 805 and 806 may be used to accomplish multiplication by two via left-shift. A compressor 801 and an adder 807 add all the partial sums to generate a throughput estimate 808. This is compared against the old estimate 809 that was derived previously using subtractor 810. If 808 is higher, a "swap col" flag is generated in 811. The swap col flag 811 may be used by a VN extractor 802 to replace the previous four entropy sources 803 with new entropy sources 804.

Figure 8B:
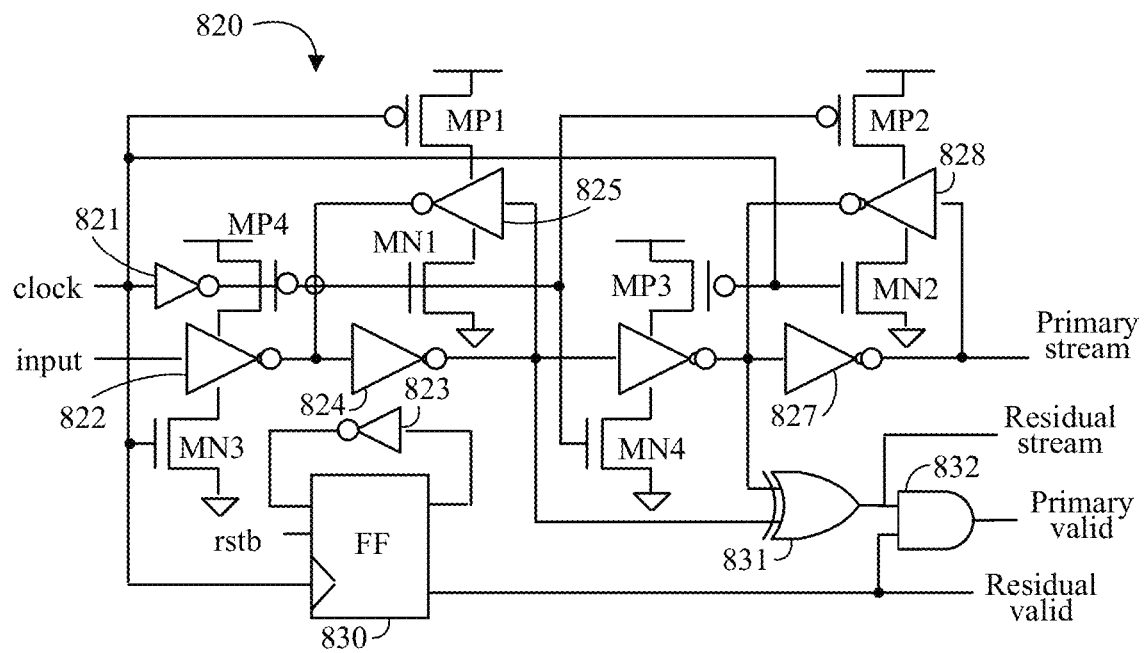
FIG. 8B is a block diagram of an example of a Von Neumann extractor according to an embodiment.

Turning now to FIG. 8B, an embodiment of a VN extractor 820 may include 20 logic gates, enabling seamless extension of the hierarchical extractor architecture for harvesting entropy from more candidate cells to increase throughput. In some embodiments, the VN extractor 820 comprises n-type transistors MN1, MN2, MN3, MN4, and p-type transistors MP1, MP2, MP3, MP4, inverters 821, 822, 823, 824, 825, 826, 827, and 828, and flip flop (FF) 830, XOR logic 831 and AND logic 832, coupled together as shown.

The "clock" input controls the circuits' operational timing, so that all operations are synchronized with a common clock. The incoming input data bits are represented by the "input" line. In some embodiments, the VN extractor has four outputs, "primary stream," "residual stream," "primary valid,", and "residual valid. The pair "primary stream" and "primary valid" represent the "random stream" output. The pair "residual stream" and "residual valid" represent the "residual stream" output. For the "random stream", the VN extractor circuit looks for transitions in two consecutive input bits. If there are no transitions, meaning input "input" is 11 or 00, then the output "primary stream" is discarded ("primary valid" is 0). However, if there is a transition, meaning that the input is 10 or 01, then the "primary valid" is 1, and output "primary stream" is 0 if the input sequence is 01, and the output "primary stream" is 1 if the input sequence is 10. The "primary stream" output, in this example, may have a varying throughput, however on average its throughput may be 25% of the input throughput. For the "residual stream", the VN extractor circuit also looks for transitions in two consecutive input bits. If there are no transitions, meaning input "input" is 11 or 00, then the output "residual stream" is discarded. "residual valid" is 1 every alternative cycle. However, if there is a transition, meaning that the input is 10 or 01, then the output "residual stream" is 1. Therefore, the VN extractor circuit may create a "1" output every alternative cycle. As a result, the "residual stream" may have a fixed throughput, which may be 50% of the input throughput.

Figure 8C:
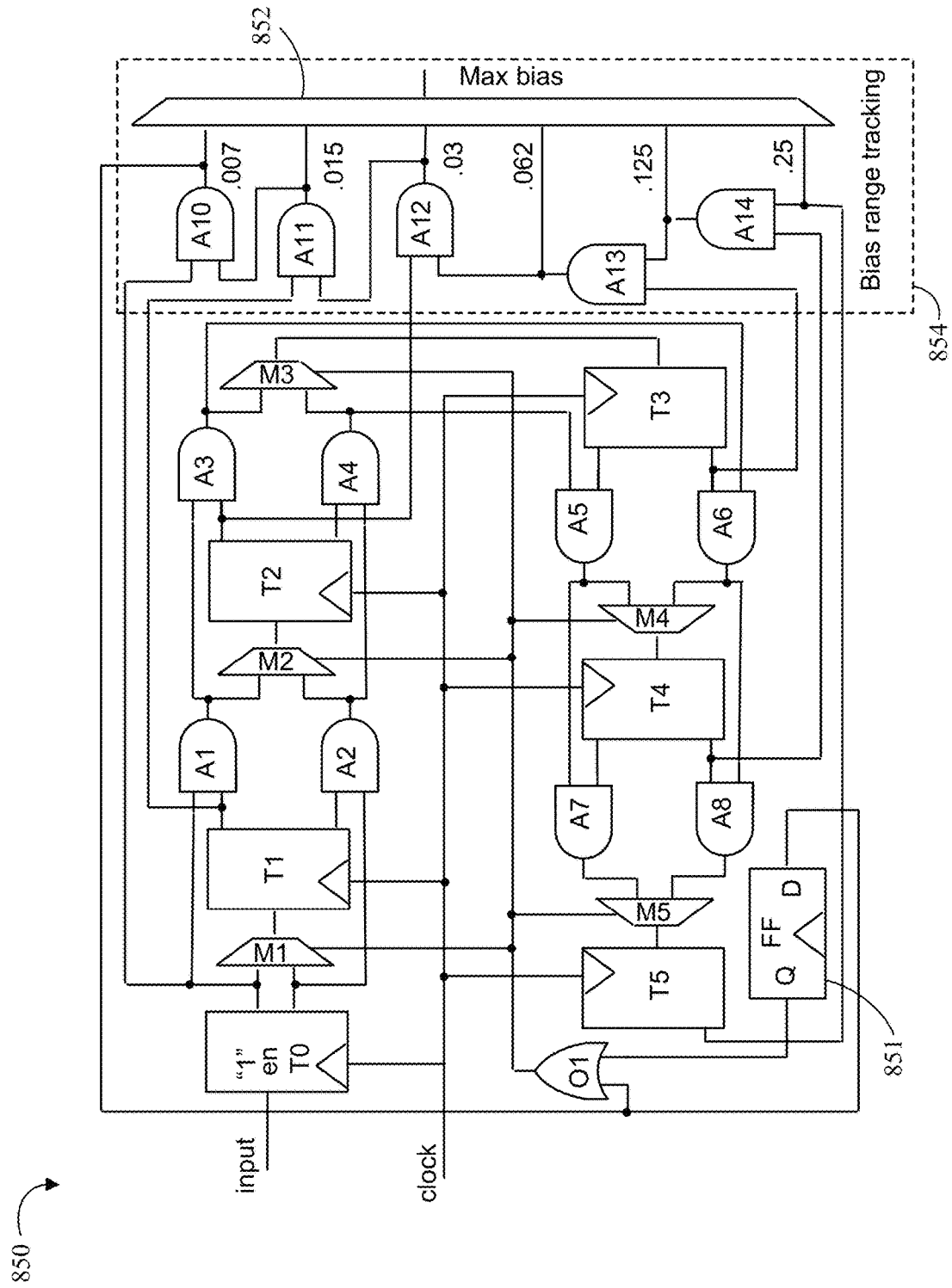
FIG. 8C is a block diagram of an example of a temporal majority voting counter according to an embodiment.

Turning now to FIG. 8C, an embodiment of TMV up-down counter 850 may include integrated bias quantification circuitry. TMV may include the process of collecting multiple measurements, through repeated measurements, and determining an output value based on the values (or votes) of each measurement. If the number of positive value (votes) exceeds a certain majority (or threshold), the output is said to be positive (1), otherwise the output is negative (0). When performing TMV, a number of consecutive measurements of a single cell are considered. In some embodiments, each cell is measured for some consecutive cycles (e.g., 127 consecutive cycles). Other number of consecutive cycles may also be used. In some embodiments, the threshold or majority of the voting is set to nearly half the number of consecutive cycles. For example, the threshold is set to (127−1)/2=63. Other threshold numbers may also be used. This is a good way to decrease the noise on cells that do not always power up to the same value, but still have a bias towards 1 or 0 in each cell. Assuming a cell that powers up to '0' 90% of the times and to '1' 10% of the times, then of a TMV over 127 measurements is done with majority threshold of 63, the output of the TMV on this cell may give a '0' 99% of the times and '1' 1% of the times. Continuing with this example, if powering up to '1' is considered erroneous for this cell, the probability of this error occurring has decreased from 10% to less than 1% by performing the TMV. However, applying TMV in this example requires 127 times more time, so it exchanges or trades-off running time of the PUF against error probability of the output.

In some embodiments, a TMV up/down counter 850 is used that progressively counts up and switches into down counting mode on reaching saturation value. For example, a 6-bit up/down counter is used for counter 850. In some embodiments, the counter 850 comprises of flip-flops T0, T1, T2, T3, T4, T5, and FF 851, AND functions A1, A2, A3, A4, A5, A6, A7, A8, A10, A11, A12, A13, A14, and OR function O1, multiplexers M1, M2, M3, M4, and M5, coupled together as shown. The TMV 850 operation is synchronized by the "clock" input, and the input data from the cells is provided at the "input" line. In some embodiments, the TMV counts can be a range of values (e.g., 1 to 127). The low counts and high counts from a cell mean stable values, and the counts in the middle are associated with unstable cells. In some embodiments, from these counts, the most 4 unstable ones are selected. The TMV 850 comprises of a modified up counter, which when reaching the saturation may start down counting. In some embodiments, the saturation count is reached at a threshold number (e.g., 63), after which the counter may start down counting. In one example, for 127 counts, for the first 63 counts, the TMV counter may count up, and then may start down counting back to zero. In such an embodiment, when the value of the count is high, it indicates measurements from an unstable cell, and when the value of the count is low, it indicates the measurements are of a stable cell. The TMV 850 is also computing the bias and providing bias quantification information, which comprises a measure of a cell's instability. The output of the counter is sitting at the output of T0, T1, T2, T3, T4, T5. In some embodiments, at the end of certain number of clock cycles (e.g., 128 cycles), if T5=1, then the counter value is more than 32; if T5=1 and T4=1, then value of the counter is more than 48 (32+16). So the cell has a counter value between 48 and 63, which means that the cell has a bias less than 25%. Similarly, in the other extreme example case, if T5=1, T4=1, T3=1, T2=1, T1=1 and T0=1, then the bias is less than 0.7. Therefore, depending on the values of T1-T5, the output of A10, A11, A12, A13 and A14 may indicate the bias values of 0.07, 0.15, 0.03, 0.62, 0.125 and 0.25, respectively; which is reflected in the multiplexer 852 output "Max bias". The final count value read from the TMV counters can hence be directly used to quantify bias without any additional post-processing hardware. In addition to accumulating the absolute TMV count, this circuit indicates whether a given cell in the entropy source (ES) array has a bias that in the worst case does not exceed a threshold e.g., 25%, 12.5%, 6.125%, 3.1%, 1.5%, or 0.75%. The bias quantification information is to identify the bi-stable cross-coupled inverter cells in the entropy source array that are unstable (i.e. least biased or unbiased). Such integrated bias quantification circuitry enables quick selection of unbiased cells or least biased cells for TRNG operation without requiring hardware to explicitly compare the absolute TMV counter values against a reference. The output of the circuit including A10, A11, A12, A13, A14 and multiplexer 852 (shown in dotted block 854) is used to build the bias map.

Figure 8D:
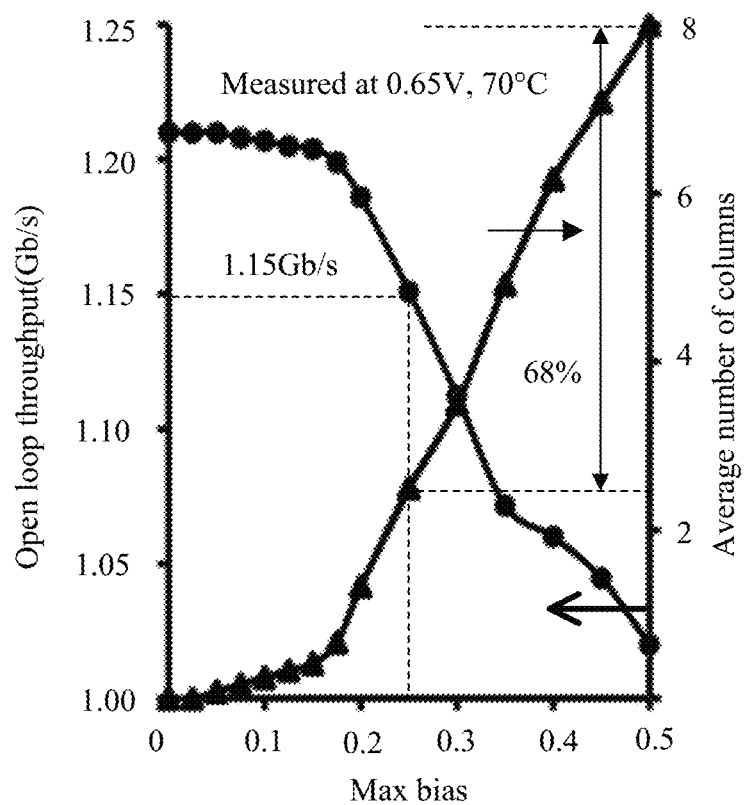
FIG. 8D is an illustrative graph of an example of maximum bias versus open loop throughput and average number of columns according to an embodiment.

It should be evident to those skilled in the art that the TMV 6-bit up/down counter 850 circuitry could be extended to any number of bits. In general for an N bit up/down counter, the architecture would require N counting flip-flops, and the similarly extended corresponding logic Turning now to FIG. 8D, a graph of max bias versus open loop throughput and average number of columns illustrates optimal column tagging in accordance with some embodiments. At power-up, a coarse-grain control loop selects the optimal column by: (i) computing biases ($b_k$) of each ES in a column; (ii) computing theoretical throughput obtained by combining the four minimum-bias ES of each column; (iii) selecting array column that maximizes throughput. Bit bias is computed using 6-bit TMV up-down counters (e.g., see FIG. 8C) that increment while sampling 1 and decrement on saturation. While an exact model for tri-level VN throughput requires complex squaring and multiply-accumulate operations, an approximator circuit with weighted sum of bias differentials accurately tracks throughput with appropriate weight choices as described in FIGS. 7A to 7C. Exhaustive analysis of weight combinations over 96 columns from 12 chips shows that weights of 8-7-6-3 accurately selects the optimal column using a shift-add circuit, enabling 72% area savings over an exact squaring-based circuit. The coarse-grain loop concurrently tags columns containing at least four ES with biases below a configurable threshold (0.7-25%) using range tracking circuits for 3% additional area. A bias floor of 25% ensures 1.15 Gb/s throughput, while tagging an average of 2.5 reserve columns for subsequent coarse-grain swapping, reducing column-swap latency by 68% as shown in FIG. 8D.

Figure 9A:
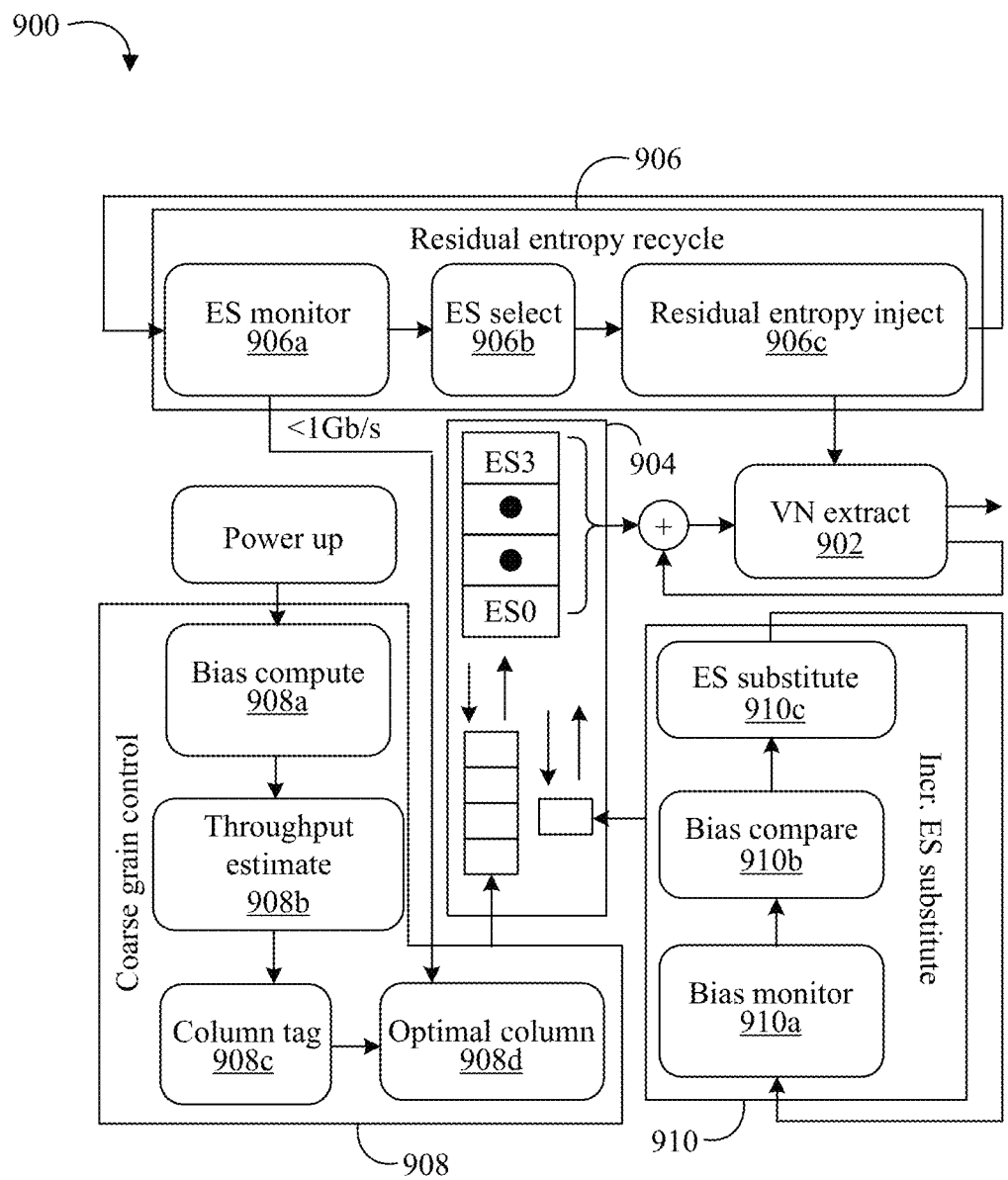
FIG. 9A is a block diagram of an example of an entropy extractor according to an embodiment.
Figure 9B:
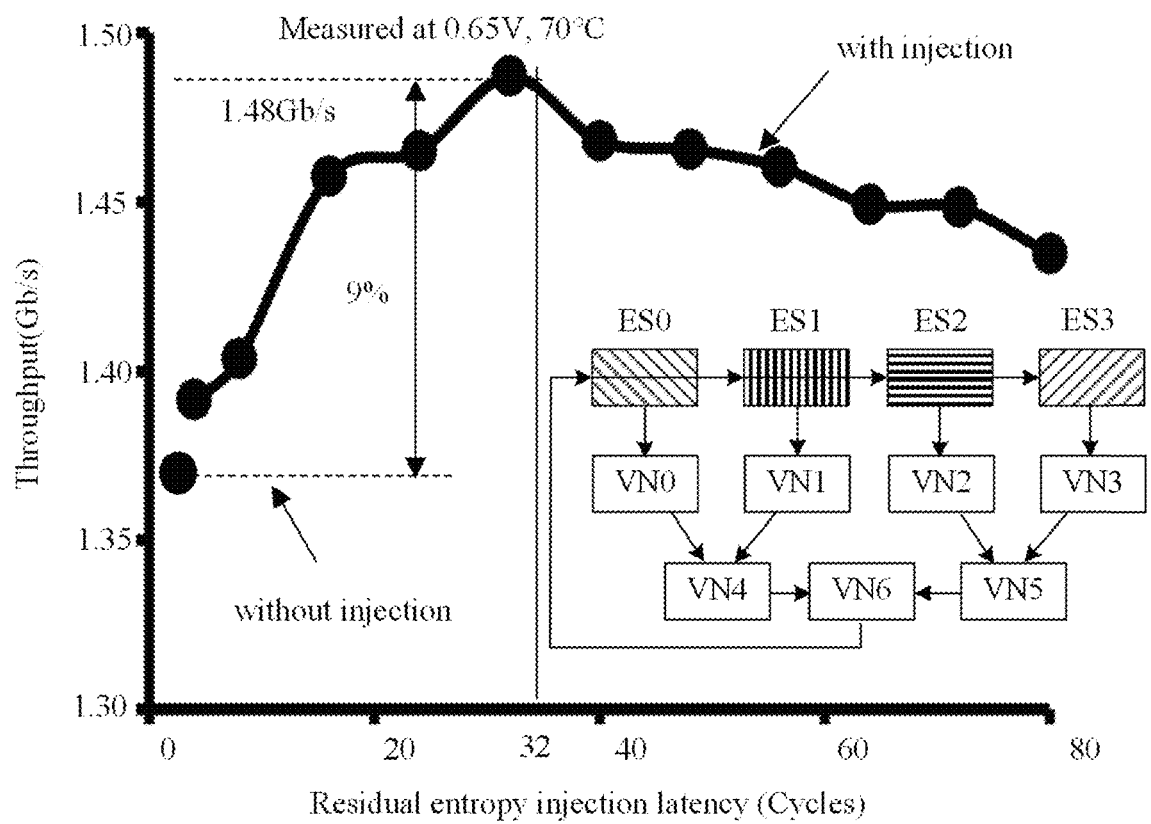
FIG. 9B is an illustrative diagram of an example of residual entropy injection latency versus throughput according to an embodiment.
Figure 9C:
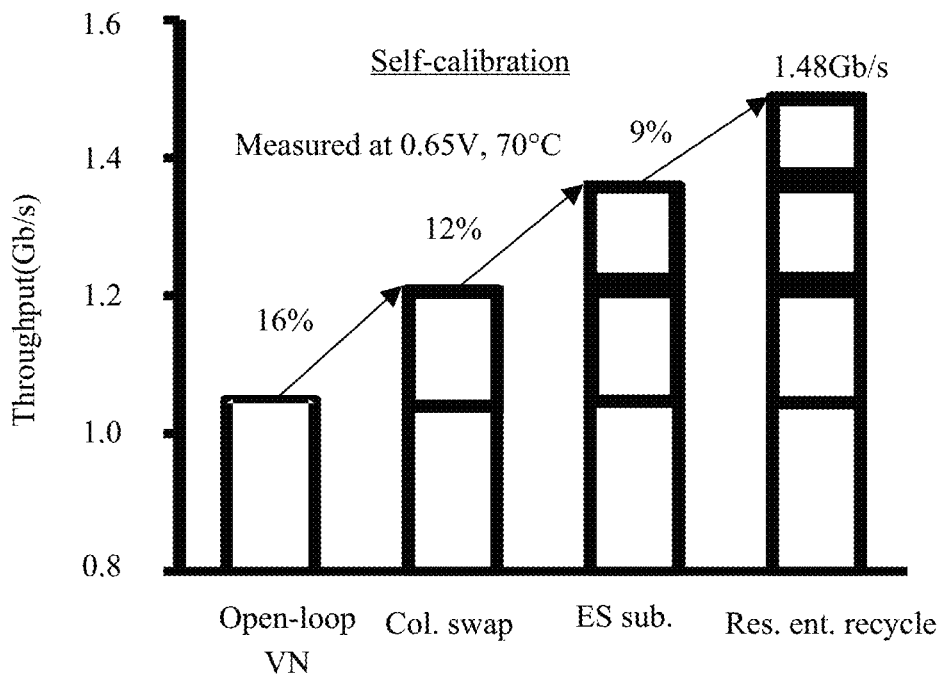
FIG. 9C is an illustrative bar graph comparing examples of various performance improvements according to an embodiment.
Figure 9D:
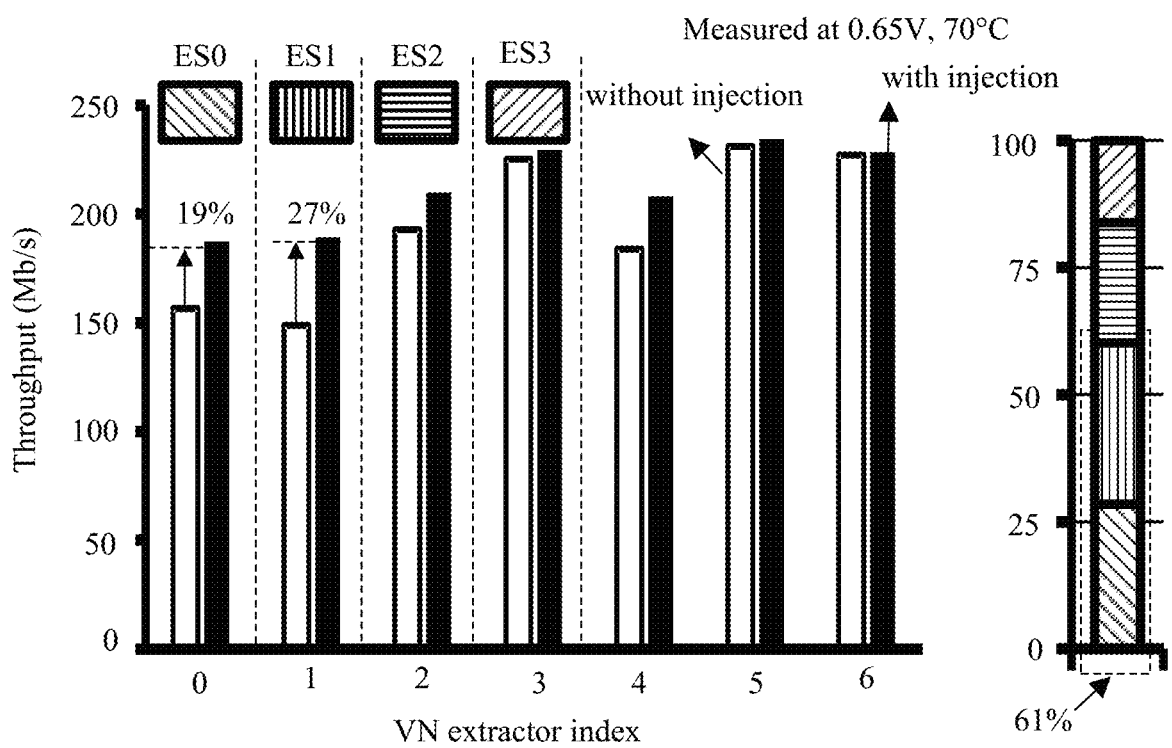
FIG. 9D is an illustrative bar graph comparing examples of Von Neumann extractor performance according to embodiments.

Turning now to FIGS. 9A to 9D, an embodiment of an entropy extractor 900 may include a VN extract circuit 902, an entropy source 904, a residual entropy recycle circuit 906, a coarse grain control circuit 908, and an incremental ES substitute circuit 910, coupled as shown. Together, the residual entropy recycle circuit 906, the coarse grain control circuit 908, and the incremental ES substitute circuit 910 may provide self-calibration technology for the entropy extractor 900. FIG. 9B illustrates an example of residual entropy injection latency versus throughput, in accordance with some embodiments. FIG. 9C illustrates various performance improvements corresponding to utilizing different aspects of self-calibration technology in accordance with some embodiments. FIG. 9D illustrates throughput for examples of VN extractors with and without injection in accordance with some embodiments.

Voltage and temperature variations can alter relative transistor strengths in cross-coupled inverters, increasing bias of a selected ES, and diminishing overall throughput. The VN extract circuit 902 may provide an entropy tracking mechanism using the variable throughput primary stream whose bitrate is inversely proportional to input bias. The self-calibration technology may continuously monitor performance of the VN extract circuit 902 and invoke the coarse-grain loop when throughput drops below a threshold of 1 Gb/s, replacing a current column with one of the previously tagged columns. Concurrent to coarse-grain loop operation, two fine grain control loops further enhance harvested entropy with incremental ES substitution and adaptive residual stream injection respectively. The ES substitution loop uses bias monitors to compare the least biased bit among 60 non-participating ES against the 4 selected ES, triggering a source substitution every 128 cycles for 12% higher throughput. TMV counters may compute bit biases over 64 cycles, followed by serial bias comparison and worst-participating ES substitution consuming the remaining 64 cycles, resulting in 38% area and 20% energy reduction compared to a design using 63 parallel comparators. The second fine-grain loop recycles residual entropy gathered from all four steams by adaptively injecting it into the VN unit processing the lowest-entropy stream. Throughput counters continuously measure input entropies in the four first-level VN units while periodically tagging the lowest-entropy unit. While frequent updates of the tagged unit (<16 cycles interval) leads to incorrect stream selection owing to a narrow sampling window, long update intervals (>48 cycles) reduce efficiency due of the introduction of a new participating array bit triggered by the ES substitution loop as shown in FIGS. 9A to 9D.

Figure 10A:
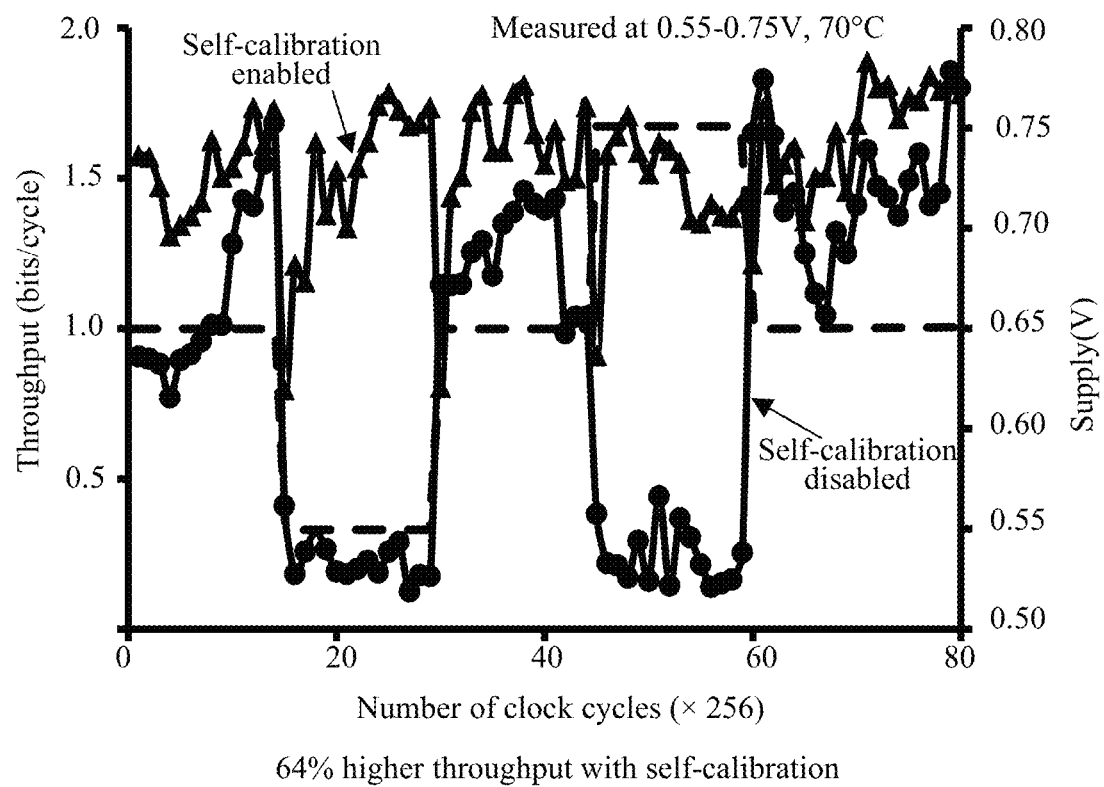
FIGS. 10A to 10C are illustrative graphs of examples of entropy extractor performance according to embodiments.
Figure 10B:
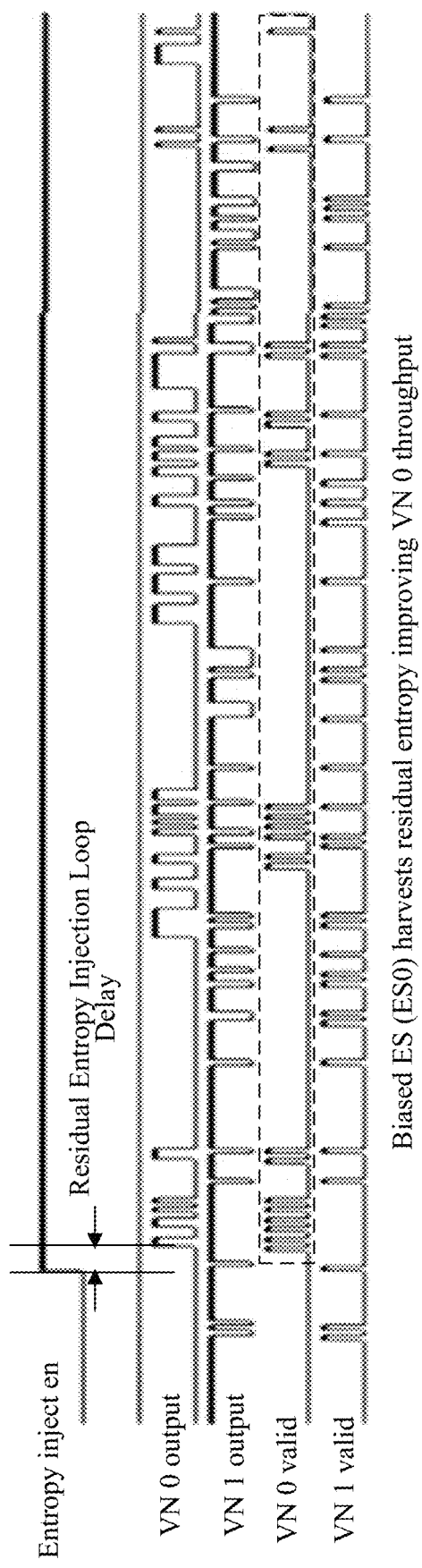
Figure 10C:
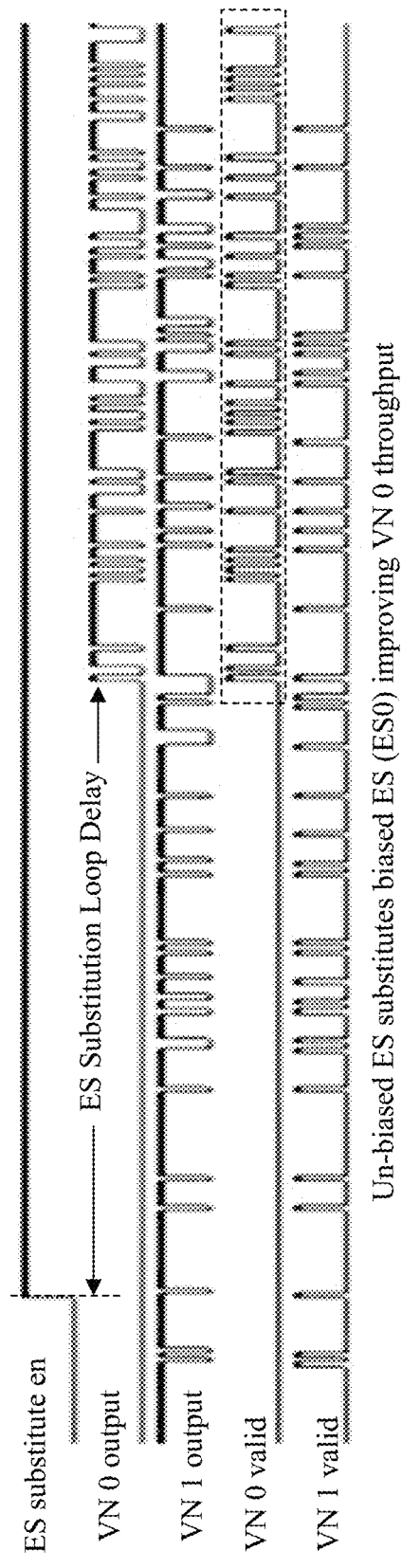

Turning now to FIGS. 10A to 10C, illustrative graphs show examples of resilience to supply voltage injection attacks (FIG. 10A) and impact of self-calibration (FIGS. 10B to 10C), in accordance with some embodiments. FIG. 10A illustrates an example comparison of an embodiment of an entropy extractor with self-calibration enabled (triangle data point markers) versus self-calibration disabled (circle data point markers) for changes in power supply voltage (no data point markers).

Measured throughput for injection loop latencies up to 80 cycles indicates peak throughput of 1.48 Gb/s at optimal injection interval of 32 cycles, a 9% improvement over open loop operation. Throughput comparisons at the 7 VN units demonstrate the efficacy of this approach as low-entropy sources (ES0 and ES1) undergo maximal residual entropy injection (61% of time) registering 19% and 27% improvement against 2% for the high-entropy ES3 that is corrected only 16% of time. In-line throughput estimation and 3-way self-calibrating control loops enable 64% higher throughput with 200 mV supply noise as shown in FIGS. 10A to 10C. The self-calibrating loops enable in-situ supply droop/overshoot detection, thereby replacing non-ideal TRNG candidates with ideal ones as shown in the FPGA waveforms in FIGS. 10B to 10C. Such supply variation events can also trigger system shut-down to mitigate side-channel attacks targeted at introducing non-idealness into the TRNG output stream.

Implementation Examples

Some embodiments may advantageously provide an all-digital unified static/dynamic entropy generator featuring self-calibrating hierarchical Von Neumann extraction for secure privacy-preserving mutual authentication in IoT mote platforms.

A common entropy source in 14 nm CMOS together with a 3-way self-calibrating hierarchical Von Neumann extractor implemented on a FPGA enable an all-digital unified static/dynamic entropy generator for flexible and secure privacy-preserving mutual authentication in compact trusted mote platforms at the edge of IoT. Measurements demonstrate 0.56/1.48 Gbps PUF/TRNG throughput with 0.9996/0.99997 static/dynamic entropy at 0.65V, 70° C. Source substitution with adaptive residual entropy injection provides 9× higher TRNG throughput and 4× energy-efficiency gain, with 25% area savings over separate PUF/TRNG implementations.

Figure 11:
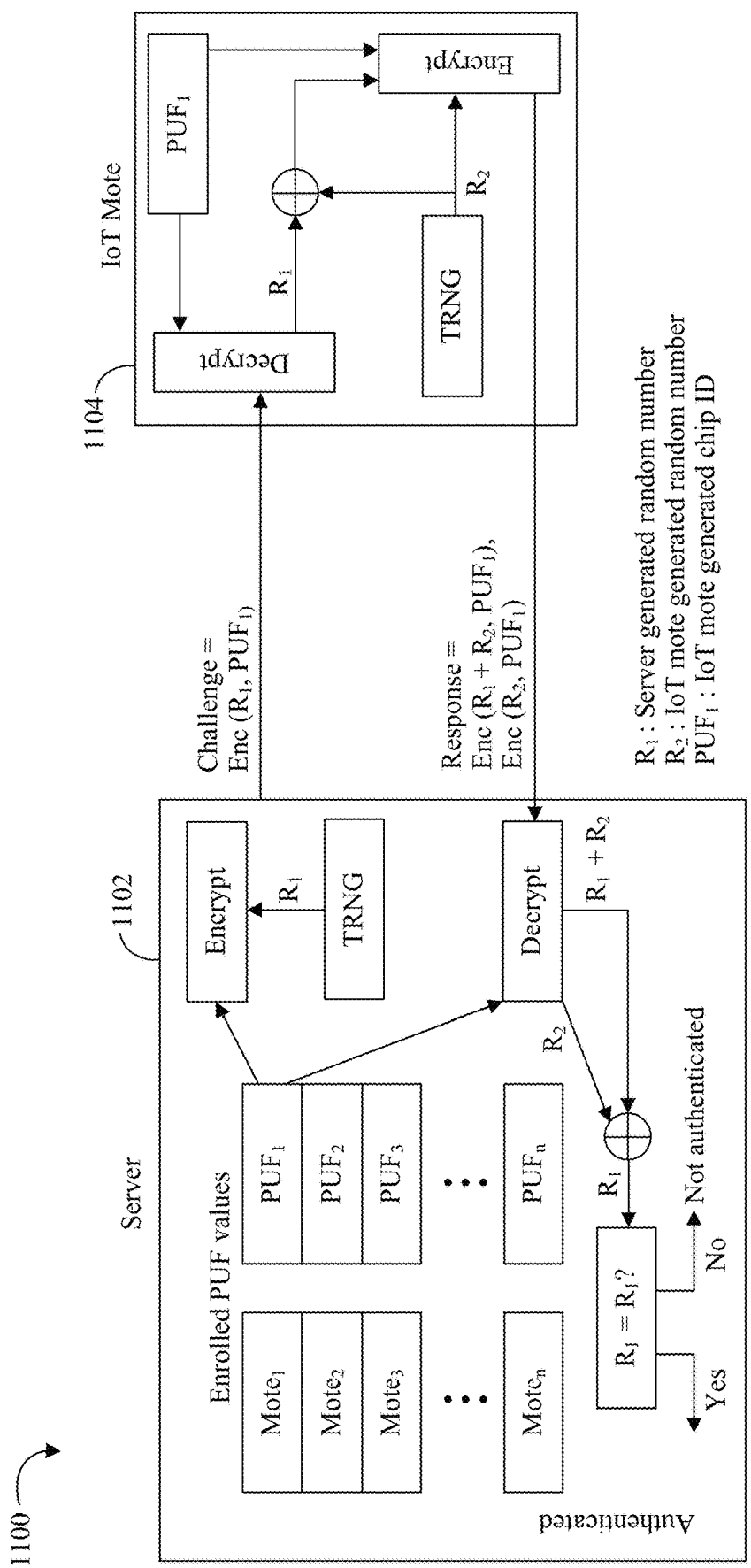
FIG. 11 is a block diagram of an example of a distributed environment according to some embodiments.

Turning now to FIG. 11, an embodiment of a distributed environment 1100 may include a server 1102 and a remote IoT mote 1104. Privacy-Preserving Mutual Authentication (PPMA) enables secure mutual identity verification between IoT motes and remote servers by encrypting challenge-response-pairs to protect against machine-learning attacks. PPMA requires both PUF and TRNG to be implemented in the compact IoT mote platform for simultaneous generation of high-entropy chip-ID and encryption keys in real time (e.g., see IoT mote 1104 in FIG. 11).

Some embodiments may provide an all-digital unified static/dynamic entropy generator leveraging a common entropy source (CES) for concurrent hybrid PUF and TRNG operation. The CES and TMV circuits are implemented in 14 nm CMOS for harvesting maximum entropy per unit area while facilitating integration on the mote SoC die. TRNG postprocessing, encrypt and decrypt modules are implemented on a FPGA for providing maximum flexibility over the lifetime of the low-cost IoT mote platform. TMV-based bias tracking and 3-way self-calibrating control loops with hierarchical Von Neumann (VN) extraction enable compact implementation and robust operation against supply variations and noises.

Unified Entropy Source Array Organization

Traditional PUF/TRNG implementations require separate sources of raw entropy to attenuate/amplify the influence of thermal noise, while exploiting/subduing the impact of device parameter variation for robust operation. In contrast, the unified design uses a single 512 b array of bi-stable cross-coupled inverters as a CES for both PUF and TRNG operations. TMV-based source selection evaluates the entire CES array, generating a bias map to classify array bits into PUF/TRNG candidates. A bias map of 6144 bits (12 dies) shows that 86% of array bits consistently evaluate to stable values, generating static entropy of 0.9996 for PUF key, with 14.8 times intra/inter-PUF hamming distance separation and 2.8% BER at 0.55-0.75V, 25-110° C. after TMV and soft dark-bit processing. The remaining 14% bits exhibit time-variant behavior, making them candidates for dynamic entropy generation. Further analysis of 75 Kbit streams from TRNG candidates shows 67% dies lack a single entropy source (ES) with sufficient raw entropy to pass NIST frequency test. This motivates the need for post-processing multiple TRNG candidates to generate a cryptographic quality bitstream.

Hierarchical Von Neumann Extraction

TRNG post-processing circuits feature a hierarchical tree of VN extractors that combine randomness harvested from a selected number of time-variant high-entropy array bits (e.g., see FIGS. 6A to 6E). In contrast to iterative VN networks that distill left-over entropy from a single ES, the VN tree collates multiple TRNG candidates while residual entropy injection simultaneously augments low-entropy sources. Each VN unit generates a variable throughput primary bitstream from transitioning input bits, along with a residual stream of left-over entropy. Throughput improves with ES count, enabling a tri-level extractor with 7 VN units processing raw streams from 4 TRNG bits to achieve bitrate>1 bit/cycle. Column-aligned TMV circuits motivate an ES array organization that maximizes the likelihood of finding 4 high-quality TRNG candidates in a single column while minimizing TMV polling overheads. A 64×8 organization with 64 TMV counters enables 69% area and 82% energy savings at 3% lower throughput over a 512×1 array (e.g., see FIGS. 7A to 7C). Postprocessed bitstreams from 12 dies indicate up to 51% open-loop throughput improvement by selecting columns with 4 high entropy TRNG bits. At power-up, a coarse-grain loop selects the optimal column by: i) computing ES biases (bk) using 6-bit decrement-on-saturate counters; ii) computing theoretical throughput by combining 4 minimum-bias ES; iii) selecting array column with highest throughput. While an exact model for tri-level VN throughput requires complex squaring operations, a shift-add approximator with weighted sum of differential-bias accurately tracks throughput with appropriate weight choices, enabling 99% accuracy and 72% area savings versus an exact squaring-based circuit. The coarse-grain loop concurrently tags columns containing at least 4 ES with biases below a configurable threshold using range tracking circuits for 3% additional area (e.g., see FIGS. 8A to 8D). A bias floor of 25% ensures 1.15 Gb/s throughput, while tagging an average of 2.5 reserve columns for subsequent coarse-grain swapping, reducing loop latency by 68%.

Self-Calibration for Variation and Noise Tolerance

Power injection attacks, supply noises and voltage/temperature variations adversely impact bias of selected ES, diminishing overall entropy and throughput. VN extractors provide runtime entropy tracking using the primary stream whose throughput is inversely proportional to input bias. A self-calibrating scheme continuously monitors VN extractor performance and invokes the coarse-grain loop when bitrate drops below 1 bit/cycle, replacing current column with a previously tagged column (e.g., see FIGS. 9A to 9D). Concurrently, two fine-grain control loops further enhance harvested entropy with incremental ES substitution and adaptive residual stream injection. The ES substitution loop uses bias monitors to compare non-participating bits with the 4 selected ES, triggering a conditional swap every 128 cycles for 12% higher throughput. Serial bias comparison over 64 cycles using a single comparator results in 38% area and 20% energy reduction versus a parallel 63-comparator design. The 2nd finegrain loop recycles residual entropy gathered from the 4 input streams by adaptively injecting it into the lowest-entropy input stream. Throughput counters measure entropy in the 4 first-level VN extractors, periodically tagging the lowest-entropy unit. Peak throughput of 1.48 Gb/s is measured at injection interval of 32 cycles, a 9% additional improvement with low-entropy sources (ES0, ES1) receiving 61% of residual entropy.

A 64×8 common entropy source fabricated in 14 nm CMOS with post-processing circuits implemented in a FPGA generates 512 b PUF key at 0.46 pJ/bit. Hierarchical VN extraction enables concurrent 1.48 Gbps TRNG operation, while passing all NIST randomness tests. In-line throughput estimation and 3-way self-calibration enable 64% higher throughput in presence of 200 mV supply noise with 9 times higher throughput and 1.6 times lower area over some other designs.

System Examples

Figure 12:
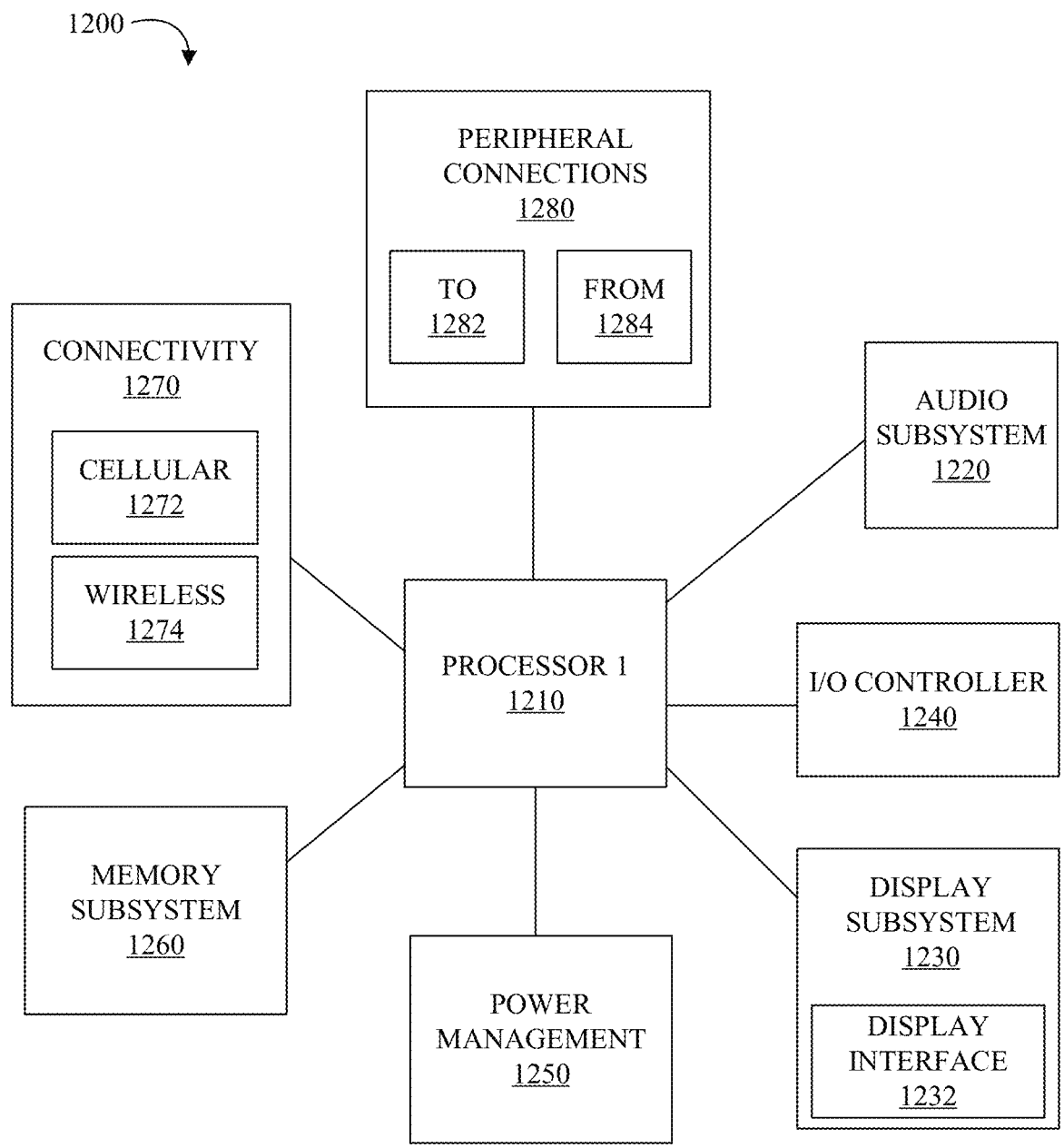
FIG. 12 is a block diagram of an example of a computing device according to some embodiments.

FIG. 12 illustrates a smart device or a computer system or a SoC (System-on-Chip) which includes a PUF and/or TRNG according to some embodiments. In some embodiments, computing device 1200 represents a mobile computing device, such as a computing tablet, a mobile phone or smart-phone, a wireless-enabled e-reader, or other wireless mobile device. It will be understood that certain components are shown generally, and not all components of such a device are shown in computing device 1200. In some embodiments, one or more components of computing device 1200, for example cellular 1272 and/or wireless 1274, include a random number generator as described with reference to various embodiments, for example coupled with a transceiver.

In some embodiments, computing device 1200 includes a first processor 1210. The various embodiments of the present disclosure may also comprise a network interface within 1270 such as a wireless interface so that a system embodiment may be incorporated into a wireless device, for example, cell phone or personal digital assistant.

In some embodiments, processor 1210 can include one or more physical devices, such as microprocessors, application processors, microcontrollers, programmable logic devices, or other processing means. The processing operations performed by processor 1210 include the execution of an operating platform or operating system on which applications and/or device functions are executed. The processing operations include operations related to I/O (input/output) with a human user or with other devices, operations related to power management, and/or operations related to connecting the computing device 1200 to another device. The processing operations may also include operations related to audio I/O and/or display I/O.

In some embodiments, computing device 1200 includes audio subsystem 1220, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1200 or connected to the computing device 1200. In some embodiments, a user interacts with the computing device 1200 by providing audio commands that are received and processed by processor 1210.

Display subsystem 1230 represents hardware (e.g., display devices) and software (e.g., drivers) components that provide a visual and/or tactile display for a user to interact with the computing device 1200. Display subsystem 1230 includes display interface 1232, which includes the particular screen or hardware device used to provide a display to a user. In some embodiments, display interface 1232 includes logic separate from processor 1210 to perform at least some processing related to the display. In some embodiments, display subsystem 1230 includes a touch screen (or touch pad) device that provides both output and input to a user.

I/O controller 1240 represents hardware devices and software components related to interaction with a user. I/O controller 1240 is operable to manage hardware that is part of audio subsystem 1220 and/or display subsystem 1230. Additionally, I/O controller 1240 illustrates a connection point for additional devices that connect to computing device 1200 through which a user might interact with the system. For example, devices that can be attached to the computing device 1200 might include microphone devices, speaker or stereo systems, video systems or other display devices, keyboard or keypad devices, or other I/O devices for use with specific applications such as card readers or other devices.

As mentioned above, I/O controller 1240 can interact with audio subsystem 1220 and/or display subsystem 1230. For example, input through a microphone or other audio device can provide input or commands for one or more applications or functions of the computing device 1200. Additionally, audio output can be provided instead of, or in addition to display output. In another example, if display subsystem 1230 includes a touch screen, the display device also acts as an input device, which can be at least partially managed by I/O controller 1240. There can also be additional buttons or switches on the computing device 1200 to provide I/O functions managed by I/O controller 1240.

In some embodiments, I/O controller 1240 manages devices such as accelerometers, cameras, light sensors or other environmental sensors, or other hardware that can be included in the computing device 1200. The input can be part of direct user interaction, as well as providing environmental input to the system to influence its operations (such as filtering for noise, adjusting displays for brightness detection, applying a flash for a camera, or other features).

In some embodiments, computing device 1200 includes power management 1250 that manages battery power usage, charging of the battery, and features related to power saving operation. Memory subsystem 1260 includes memory devices for storing information in computing device 1200. Memory can include nonvolatile (state does not change if power to the memory device is interrupted) and/or volatile (state is indeterminate if power to the memory device is interrupted) memory devices. Memory subsystem 1260 can store application data, user data, music, photos, documents, or other data, as well as system data (whether long-term or temporary) related to the execution of the applications and functions of the computing device 1200.

Elements of embodiments are also provided as a machine-readable medium (e.g., memory 1260) for storing the computer-executable instructions. The machine-readable medium (e.g., memory 1260) may include, but is not limited to, flash memory, optical disks.

CD-ROMs, DVD ROMs, RAMs, EPROMs, EEPROMs, magnetic or optical cards, phase change memory (PCM), or other types of machine-readable media suitable for storing electronic or computer-executable instructions. For example, features or aspects of some embodiments may be downloaded as a computer program (e.g., BIOS) which may be transferred from a remote computer (e.g., a server) to a requesting computer (e.g., a client) by way of data signals via a communication link (e.g., a modem or network connection).

Connectivity 1270 includes hardware devices (e.g., wireless and/or wired connectors and communication hardware) and software components (e.g., drivers, protocol stacks) to enable the computing device 1200 to communicate with external devices. The computing device 1200 could be separate devices, such as other computing devices, wireless access points or base stations, as well as peripherals such as headsets, printers, or other devices.

Connectivity 1270 can include multiple different types of connectivity. To generalize, the computing device 1200 is illustrated with cellular connectivity 1272 and wireless connectivity 1274. Cellular connectivity 1272 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1274 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1280 include hardware interfaces and connectors, as well as software components (e.g., drivers, protocol stacks) to make peripheral connections. It will be understood that the computing device 1200 could both be a peripheral device ("to" 1282) to other computing devices, as well as have peripheral devices ("from" 1284) connected to it. The computing device 1200 commonly has a "docking" connector to connect to other computing devices for purposes such as managing (e.g., downloading and/or uploading, changing, synchronizing) content on computing device 1200. Additionally, a docking connector can allow computing device 1200 to connect to certain peripherals that allow the computing device 1200 to control content output, for example, to audiovisual or other systems.

In addition to a proprietary docking connector or other proprietary connection hardware, the computing device 1200 can make peripheral connections 1280 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Figure 13:
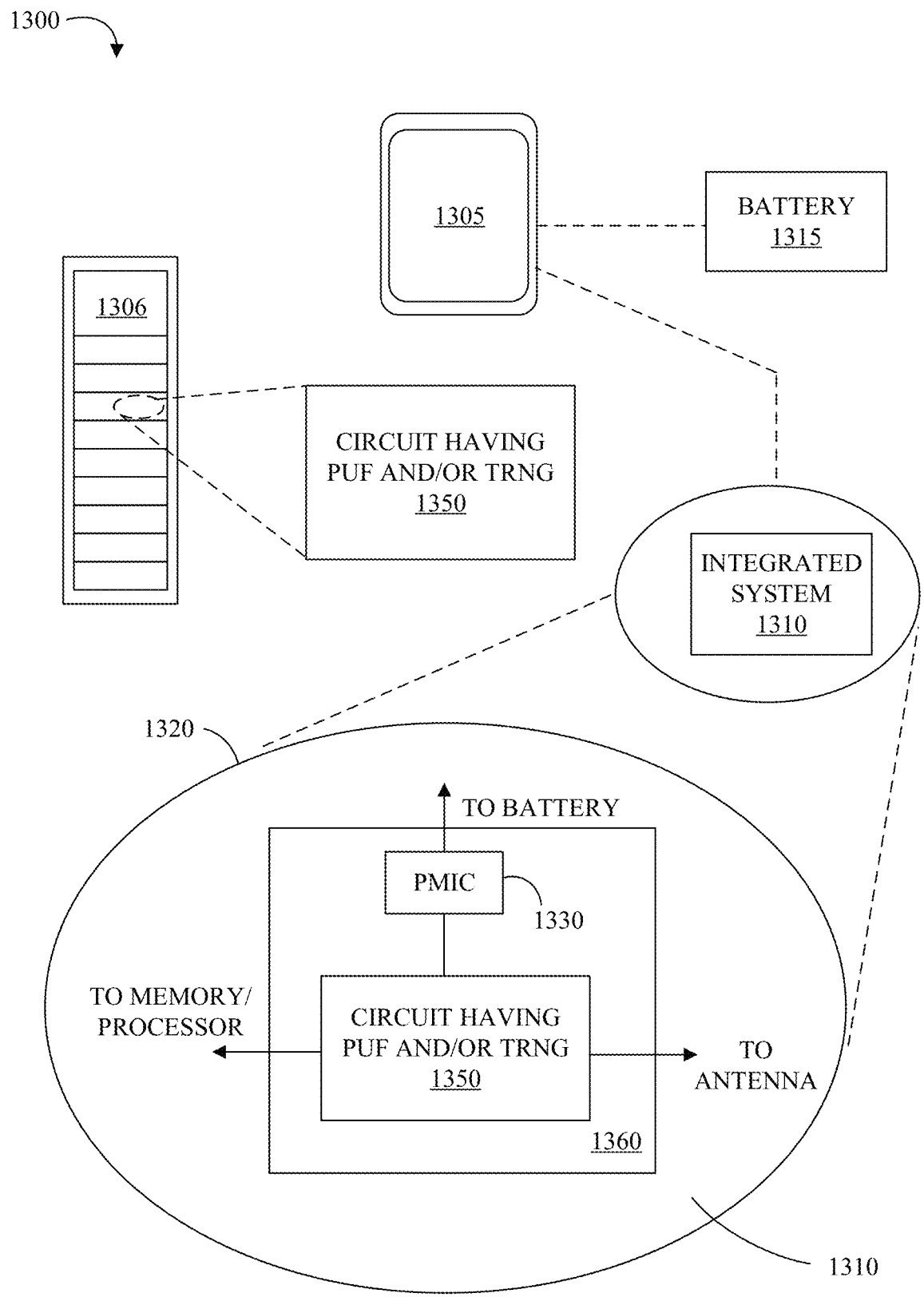
FIG. 13 is a block diagram of an example of a system according to some embodiments.

FIG. 13 illustrates a system 1300 in which a mobile computing platform 1305 and/or a data server machine 1306 employs circuitry including at least one PUF or TRNG, for example in accordance with some embodiments described elsewhere herein. The server machine 1306 may be any commercial server, for example including any number of high-performance computing platforms disposed within a rack and networked together for electronic data processing, which in the exemplary embodiment includes a circuitry 1350. The mobile computing platform 1305 may be any portable device configured for each of electronic data display, electronic data processing, wireless electronic data transmission, or the like. For example, the mobile computing platform 1305 may be any of a tablet, a smart phone, laptop computer, etc., and may include a display screen (e.g., a capacitive, inductive, resistive, or optical touchscreen), a chip-level or package-level integrated system 1310, and a battery 1315.

Whether disposed within the integrated system 1310 illustrated in the expanded view 1320, or as a stand-alone discrete or packaged multi-chip module within the server machine 1306, the circuit includes at least one random number generator, for example in accordance with some embodiments described elsewhere herein. Circuitry 1350 may be further attached to a board, a substrate, or an interposer 1360 along with a power management integrated circuit (PMIC). Functionally, PMIC 1330 may perform battery power regulation, DC-to-DC conversion, etc., and so has an input coupled to battery 1315 and with an output providing a current supply to other functional modules.

Circuitry 1350, in some embodiments, includes RF (wireless) integrated circuitry (RFIC) further including a wideband RF (wireless) transmitter and/or receiver (TX/RX including a digital baseband and an analog front-end module comprising a power amplifier on a transmit path and a low noise amplifier on a receive path). The RFIC includes at least one random number generator, for example in an over-voltage protection circuit as describe elsewhere herein. The RFIC has an output coupled to an antenna (not shown) to implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond.

Additional Notes and Examples

Example 1 may include an electronic processing system, comprising a processor, memory communicatively coupled to the processor, and an entropy extractor communicatively coupled to the processor, the entropy extractor including a physically unclonable function (PUF), a true random number generator (TRNG), an entropy source coupled to both the PUF and the TRNG, and a circuit to self-calibrate the entropy extractor.

Example 2 may include the system of Example 1, wherein the circuit is further to adaptively select the entropy source.

Example 3 may include the system of Example 2, wherein the circuit is further to measure a stability of cells of the PUF, and replace less unstable cells of the PUF with highly unstable cells of the PUF.

Example 4 may include the system of any of Examples 1 to 3, wherein the circuit is further to provide residual entropy injection.

Example 5 may include the system of Example 4, wherein the circuit is further to inject left over entropy of more unstable cells of the TRNG into less unstable cells of the TRNG.

Example 6 may include the system of any of Examples 1 to 5, wherein the circuit is further to identify a voltage glitch attack on the entropy extractor.

Example 7 may include the system of Example 6, wherein the circuit is further to swap out cells under attack in response to the identified voltage glitch attack.

Example 8 may include the system of Example 6, wherein the circuit is further to shut down operation in response to the identified voltage glitch attack.

Example 9 may include the system of any of Examples 1 to 8, wherein the entropy extractor comprises a Von-Neumann extractor.

Example 10 may include the system of Example 9, wherein the Von-Neumann extractor is further to sample highly unstable cells in the PUF, generate a TRNG bit-stream, and continuously monitor the TRNG bit-stream for quality assurance.

Example 11 may include a semiconductor package apparatus, comprising one or more substrates, and an entropy extractor coupled to the one or more substrates, wherein the entropy extractor is at least partly implemented in one or more of configurable circuitry and fixed-functionality hardware circuitry, the entropy extractor coupled to the one or more substrates including a physically unclonable function (PUF), a true random number generator (TRNG), an entropy source coupled to both the PUF and the TRNG, and a circuit to self-calibrate the entropy extractor.

Example 12 may include the apparatus of Example 11, wherein the circuit is further to adaptively select the entropy source.

Example 13 may include the apparatus of Example 12, wherein the circuit is further to measure a stability of cells of the PUF, and replace less unstable cells of the PUF with highly unstable cells of the PUF.

Example 14 may include the apparatus of any of Examples 11 to 13, wherein the circuit is further to provide residual entropy injection.

Example 15 may include the apparatus of Example 14, wherein the circuit is further to inject left over entropy of more unstable cells of the TRNG into less unstable cells of the TRNG.

Example 16 may include the apparatus of any of Examples 11 to 15, wherein the circuit is further to identify a voltage glitch attack on the entropy extractor.

Example 17 may include the apparatus of Example 16, wherein the circuit is further to swap out cells under attack in response to the identified voltage glitch attack.

Example 18 may include the apparatus of Example 16, wherein the circuit is further to shut down operation in response to the identified voltage glitch attack.

Example 19 may include the apparatus of any of Examples 11 to 18, wherein the entropy extractor comprises a Von-Neumann extractor.

Example 20 may include the apparatus of Example 19, wherein the Von-Neumann extractor is further to sample highly unstable cells in the PUF, generate a TRNG bit-stream, and continuously monitor the TRNG bit-stream for quality assurance.

Example 21 may include the apparatus of any of Examples 11 to 20, wherein the entropy extractor coupled to the one or more substrates includes transistor channel regions that are positioned within the one or more substrates.

Example 22 may include an entropy extractor apparatus, comprising a physically unclonable function (PUF) array, a true random number generator (TRNG), an entropy source coupled to both the PUF array and the TRNG, and means for self-calibrating entropy extraction.

Example 23 may include the apparatus of Example 22, further comprising means for adaptively selecting the entropy source.

Example 24 may include the apparatus of Example 23, further comprising means for measuring a stability of cells of the PUF, and means for replacing less unstable cells of the PUF with highly unstable cells of the PUF.

Example 25 may include the apparatus of any of Examples 22 to 24, further comprising means for providing residual entropy injection.

Example 26 may include the apparatus of Example 25, further comprising means for injecting left over entropy of more unstable cells of the TRNG into less unstable cells of the TRNG.

Example 27 may include the apparatus of any of Examples 22 to 26, further comprising means for identifying a voltage glitch attack.

Example 28 may include the apparatus of Example 27, further comprising means for swapping out cells under attack in response to the identified voltage glitch attack.

Example 29 may include the apparatus of Example 27, further comprising means for shutting down operation in response to the identified voltage glitch attack.

Example 30 may include the apparatus of any of Examples 22 to 29, further comprising Von-Neumann extractor means.

Example 31 may include the apparatus of Example 30, wherein the Von-Neumann extractor means further comprises means for sampling highly unstable cells in the PUF, means for generating a TRNG bit-stream, and means for continuously monitoring the TRNG bit-stream for quality assurance.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
    a processor;
    memory communicatively coupled to the processor; and
    an entropy extractor communicatively coupled to the processor, the entropy extractor including:
        an entropy source,
        a physically unclonable function (PUF) to execute a static entropy generation process based on first data from the entropy source,
        a true random number generator (TRNG) to select second data from entropy data of the entropy source based on biases of cells of the entropy source, and execute a dynamic entropy generation process based on the second data, and
        a circuit to self-calibrate the entropy extractor.

2. The system of claim 1, wherein the circuit is further to:
    adaptively select the entropy source;
    measure a stability of cells of the entropy source; and
    replace less unstable cells of the entropy source with highly unstable cells of the entropy source.

3. The system of claim 1, wherein the circuit is further to:
    provide residual entropy injection.

4. The system of claim 3, wherein the circuit is further to:
    inject left over entropy of more unstable cells of the TRNG into less unstable cells of the TRNG.

5. The system of claim 1, wherein the circuit is further to:
    identify a voltage glitch attack on the entropy extractor.

6. The system of claim 5, wherein the circuit is further to:
    swap out cells under attack in response to the identified voltage glitch attack.

7. The system of claim 5, wherein the circuit is further to:
    shut down operation in response to the identified voltage glitch attack.

8. The system of claim 1, wherein the entropy extractor comprises a Von-Neumann extractor.

9. The system of claim 8, wherein the Von-Neumann extractor is further to:
    sample highly unstable cells in the PUF;
    generate a TRNG bit-stream; and
    continuously monitor the TRNG bit-stream for quality assurance.

10. The system of claim 1, wherein the TRNG is to:
    identify a temporal majority voting result associated with the cells of the entropy source, wherein the temporal majority voting result is to include bias quantification information for each cell of the entropy source;
    generate a bias map based on the temporal majority voting result; and
    select the second data from entropy data of the entropy source based on the bias map.

11. A semiconductor package apparatus, comprising:
    one or more substrates; and
    an entropy extractor coupled to the one or more substrates, wherein the entropy extractor is at least partly implemented in one or more of configurable circuitry or fixed-functionality logic hardware, the entropy extractor coupled to the one or more substrates including:
        an entropy source,
        a physically unclonable function (PUF) to execute a static entropy generation process based on first data from the entropy source,
        a true random number generator (TRNG) to select second data from entropy data of the entropy source based on biases of cells of the entropy source, and execute a dynamic entropy generation process based on the second data, and
        a circuit to self-calibrate the entropy extractor.

12. The apparatus of claim 11, wherein the circuit is further to:
    adaptively select the entropy source;
    measure a stability of cells of the entropy source; and replace less unstable cells of the PUF entropy source with highly unstable cells of the entropy source.

13. The apparatus of claim 11, wherein the circuit is further to:
provide residual entropy injection.

14. The apparatus of claim 13, wherein the circuit is further to:
inject left over entropy of more unstable cells of the TRNG into less unstable cells of the TRNG.

15. The apparatus of claim 11, wherein the circuit is further to:
identify a voltage glitch attack on the entropy extractor.

16. The apparatus of claim 15, wherein the circuit is further to:
swap out cells under attack in response to the identified voltage glitch attack.

17. The apparatus of claim 15, wherein the circuit is further to:
shut down operation in response to the identified voltage glitch attack.

18. The apparatus of claim 11, wherein the entropy extractor comprises a Von-Neumann extractor.

19. The apparatus of claim 18, wherein the Von-Neumann extractor is further to:
sample highly unstable cells in the PUF;
generate a TRNG bit-stream; and
continuously monitor the TRNG bit-stream for quality assurance.

20. The apparatus of claim 11, wherein the entropy extractor coupled to the one or more substrates includes transistor channel regions that are positioned within the one or more substrates.

21. The apparatus of claim 11, wherein the TRNG is to:
identify a temporal majority voting result associated with the cells of the entropy source, wherein the temporal majority voting result is to include bias quantification information for each cell of the entropy source;
generate a bias map based on the temporal majority voting result; and
select the second data from entropy data of the entropy source based on the bias map.

22. An entropy extractor apparatus, comprising:
an entropy source;
a physically unclonable function (PUF) to execute a static entropy generation process based on first data from the entropy source;
a true random number generator (TRNG) to select second data from entropy data of the entropy source based on biases of cells of the entropy source, and execute a dynamic entropy generation process based on the second data; and
means for self-calibrating entropy extraction.

23. The apparatus of claim 22, wherein the TRNG is to:
identify a temporal majority voting result associated with the cells of the entropy source, wherein the temporal majority voting result is to include bias quantification information for each cell of the entropy source;
generate a bias map based on the temporal majority voting result; and
select the second data from entropy data of the entropy source based on the bias map.

24. The apparatus of claim 22, further comprising:
means for adaptively selecting the entropy source;
means for measuring a stability of cells of the PUF; and
means for replacing less unstable cells of the PUF with highly unstable cells of the PUF.

25. The apparatus of claim 22, further comprising:
means for providing residual entropy injection.

* * * * *